United States Patent
Ramsperger et al.

(10) Patent No.: US 12,166,762 B2
(45) Date of Patent: Dec. 10, 2024

(54) AUTHORIZATION MANAGEMENT IN A MEDIA PLAYBACK SYSTEM

(71) Applicant: Sonos, Inc., Santa Barbara, CA (US)

(72) Inventors: Gregory Ramsperger, Portland, OR (US); Steven Beckhardt, Boston, MA (US); Keith Thoresz, Belmont, MA (US); Ryan Moak, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 90 days.

(21) Appl. No.: 17/662,530

(22) Filed: May 9, 2022

(65) Prior Publication Data

US 2022/0360585 A1 Nov. 10, 2022

Related U.S. Application Data

(60) Provisional application No. 63/186,520, filed on May 10, 2021.

(51) Int. Cl.
| | |
|---|---|
| *H04L 9/40* | (2022.01) |
| *G06F 3/16* | (2006.01) |
| *G06F 21/33* | (2013.01) |
| *G06F 21/44* | (2013.01) |
| *G06F 21/60* | (2013.01) |

(Continued)

(52) U.S. Cl.
CPC ............ *H04L 63/101* (2013.01); *G06F 21/33* (2013.01); *G06F 21/604* (2013.01); *G10L 17/22* (2013.01)

(58) Field of Classification Search
CPC .............. H04L 63/101; H04L 63/0807; H04L 63/102; H04L 63/105; G06F 21/33; G06F 21/604; G06F 2221/2141; G06F 3/165; G06F 21/44; G06F 21/629; G10L 17/22; H04N 21/25816; H04N 21/25875; H04N 21/41265; H04N 21/4227; H04N 21/43615; H04N 21/8113
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Darren B Schwartz
(74) *Attorney, Agent, or Firm* — Fortem IP LLP

(57) ABSTRACT

Example techniques described herein involve authorization management in a media playback system. Within examples, a client, such as a control device, may authenticate with a playback device using a token. The playback device may resolve a role corresponding to the token using a token-to-role mapping hosted at an authentication service. After resolving the role, the playback device may resolve a permissions set corresponding to the role using a role-to-permissions mapping similarly hosted at the authentication service. Within examples, such mappings may be cached locally at the edge (e.g., on a playback device).

20 Claims, 15 Drawing Sheets

(51) Int. Cl.
*G06F 21/62* (2013.01)
*G10L 17/22* (2013.01)
*H04N 21/258* (2011.01)
*H04N 21/41* (2011.01)
*H04N 21/436* (2011.01)
*H04N 21/81* (2011.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,774,586 | B1* | 9/2017 | Roche ............... H04L 63/08 |
| 10,009,337 | B1* | 6/2018 | Fischer ............ H04L 67/1097 |
| 10,044,723 | B1* | 8/2018 | Fischer ............ H04L 63/102 |
| 10,311,248 | B1* | 6/2019 | Ilkal ............... H04L 63/20 |
| 10,666,657 | B1* | 5/2020 | Threlkeld .......... H04L 9/0643 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2005/0081063 | A1* | 4/2005 | Patrick ............. G06F 21/6218 726/4 |
| 2007/0142944 | A1 | 6/2007 | Goldberg et al. |
| 2009/0007249 | A1* | 1/2009 | Lu .................. H04L 63/08 726/9 |
| 2010/0083213 | A1* | 4/2010 | Chouinard .......... G06F 8/20 717/100 |
| 2010/0162389 | A1* | 6/2010 | Burger ............. G06F 21/6218 726/21 |
| 2016/0283737 | A1* | 9/2016 | Soman ............. G06F 21/6245 |
| 2019/0273617 | A1* | 9/2019 | Maher ............... H04L 9/085 |
| 2020/0302032 | A1* | 9/2020 | Gopireddy ......... G06F 21/629 |
| 2020/0314486 | A1 | 10/2020 | Thoresz et al. |
| 2021/0036860 | A1* | 2/2021 | Ranganathan ...... H04L 63/102 |
| 2021/0133359 | A1* | 5/2021 | Liu ................ G06F 21/64 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Search Report and Written Opinion mailed on Jul. 21, 2022, issued in connection with International Application No. PCT/US2022/072211, filed on May 9, 2022, 14 pages.
Wikipedia. Authorization, Apr. 6, 2021, 2 pages. [retrieved on Jul. 11, 2022], Retrieved from the Internet: URL: https://en.wikipedia.org/w/index.php?t%20itle=Authorizationoldid=1016282035.
Wikipedia. Proxy server, Introduction at p. 1 Section "Improving performance" at p. 6, May 6, 2021, 8 pages. [retrieved on Jul. 12, 2022], Retrieved from the Internet: URL: https://en.wikipedia.org/w/index.php?t% 20itle=Proxy_serveroldid=1021671266.
Wikipedia. Role-based access control, Introduction at p. 1, Section "Design" bridging pp. 1 and 2, Feb. 20, 2021, 4 pages. [retrieved on Jul. 7, 2022], Retrieved from the Internet: URL: https://en.wikipedia.org/w/index.php? title=Role-based_access_control oldid=1007819513.

* cited by examiner

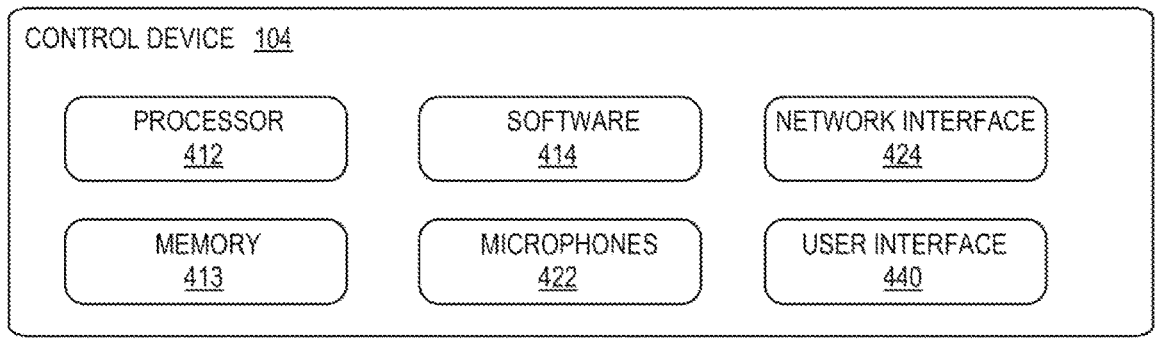
Fig. 4
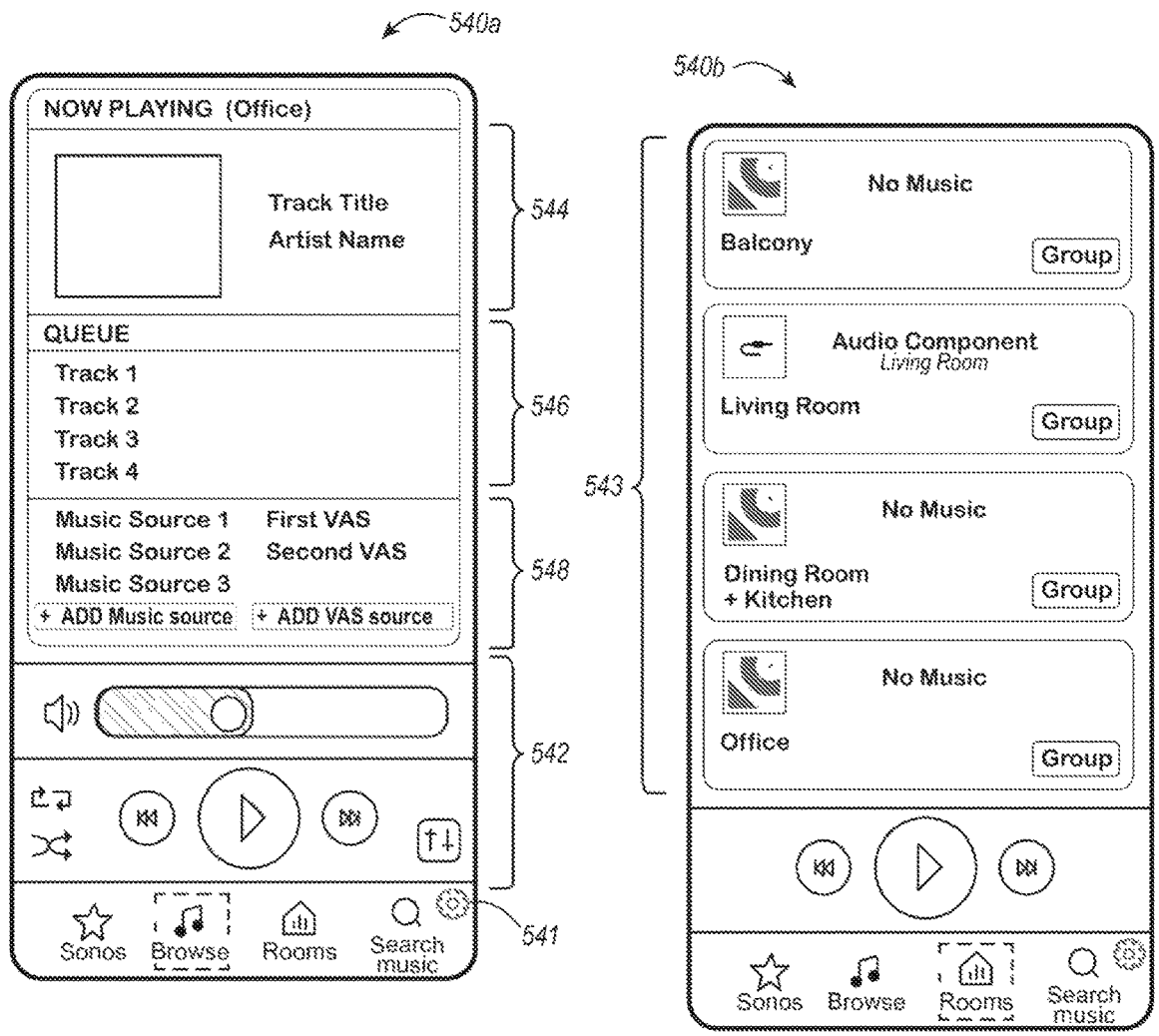
Fig. 5A
Fig. 5B

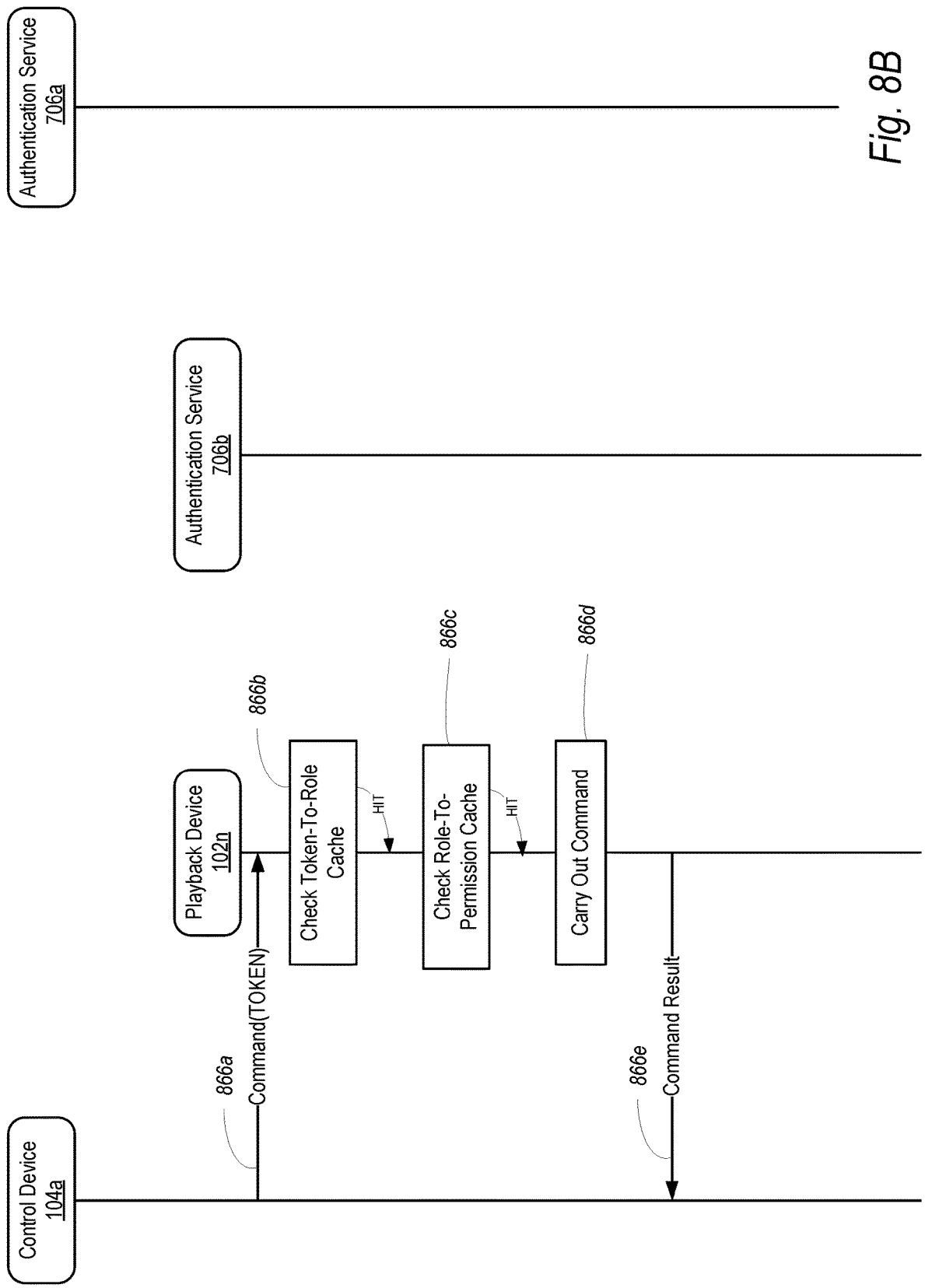

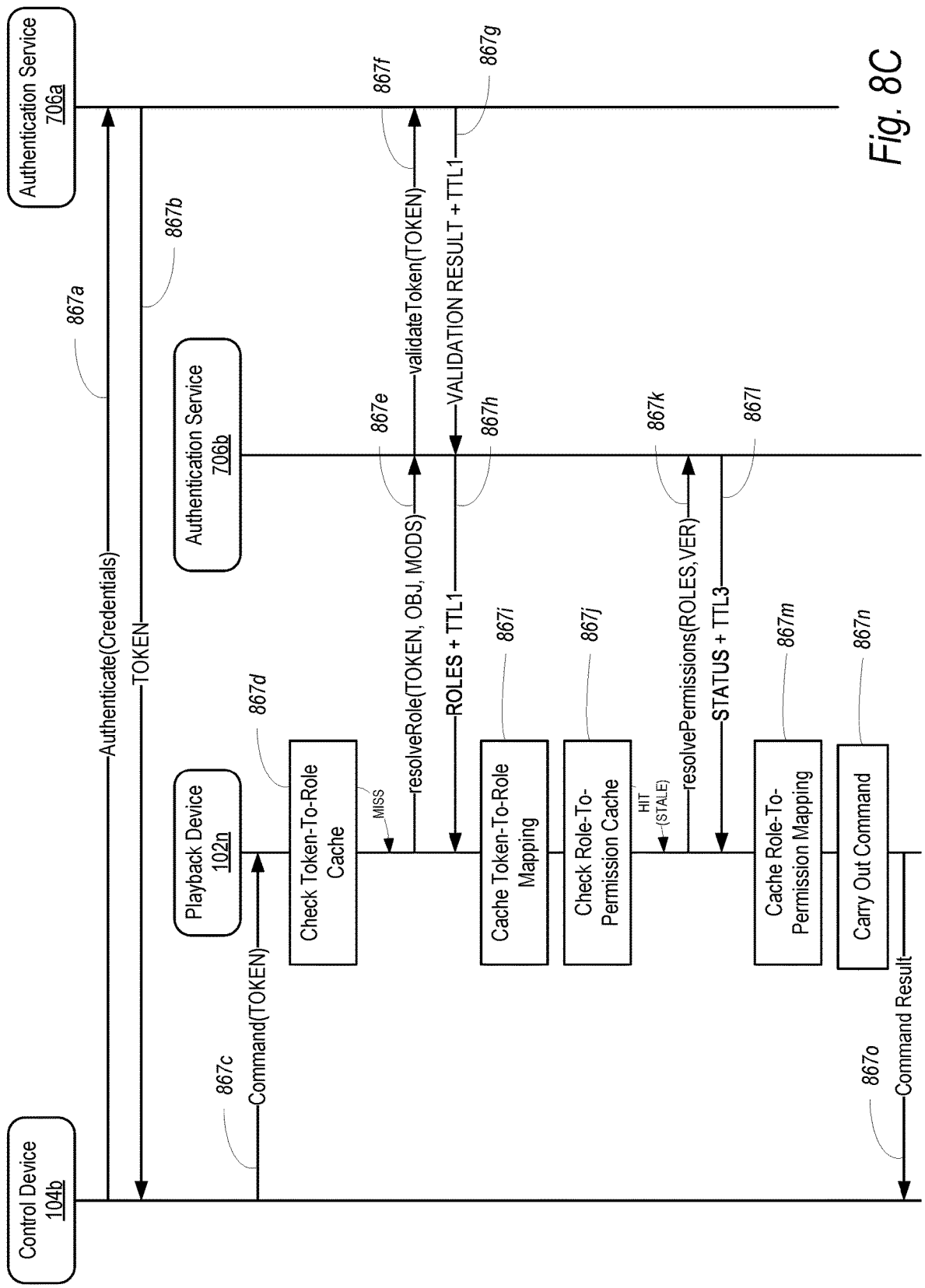

AUTHORIZATION MANAGEMENT IN A MEDIA PLAYBACK SYSTEM

CROSS-REFERENCE TO RELATED APPLICATION

The present application claims the benefit of priority to U.S. Patent Application No. 63/186,520, filed May 10, 2021, which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4 is a functional block diagram of an example controller device in accordance with aspects of the disclosure.

FIGS. 5A and 5B are controller interfaces in accordance with aspects of the disclosure.

FIGS. 8A, 8B, and 8C are example message flow diagrams illustrating example authorization management in accordance with aspects of the disclosed technology.

Figure 1A:
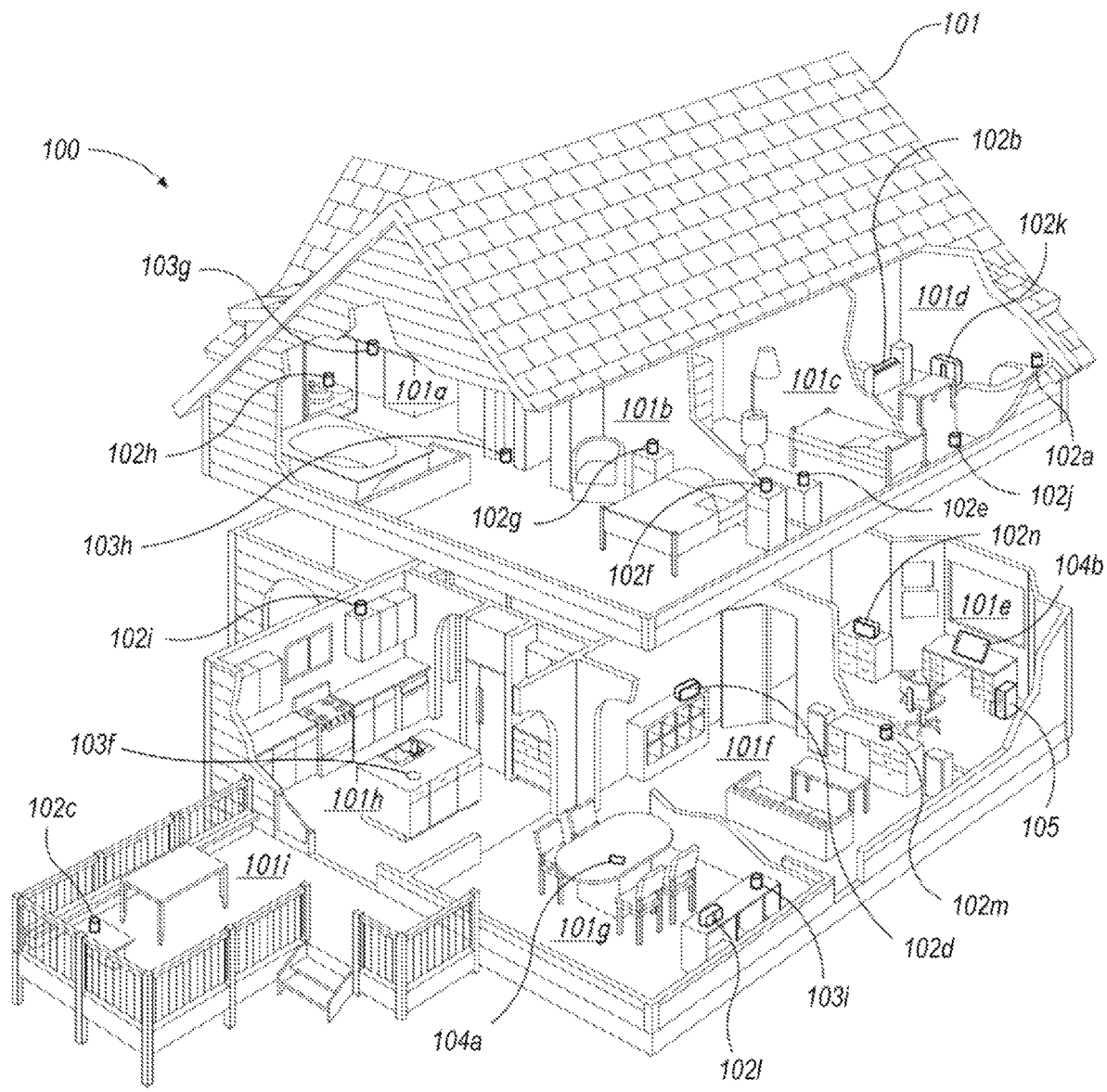
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Example techniques described herein involve authorization management in a media playback system. A media playback system may include one or more playback devices, which may take the form of "smart" speakers having integrated processors, memory, operating systems, and applications configured to perform audio playback and related functions. Such audio playback and other functions of the playback device(s) are controllable using a controller, such as a control application installed on another computing device (e.g., a mobile device or laptop) via network messaging (e.g., via a local area network). Certain actions require a client (e.g., a controller) to be authenticated and provided a set of permissions before the client can access restricted data (e.g., state information) or perform restricted actions on the playback device.

Example authorization management may involve authenticating a client. Example clients include controllers, which may be first-party (e.g., a controller application developed by the manufacturer of the media playback system to provide control functionality) and third-party (e.g., applications developed by various content services, such as streaming audio services, that support one or more application programming interfaces (API)s to enable control of the playback devices within the media playback system. An client may send authentication credentials (e.g., a user name/password, a pin, scanned token, client SSL certificate, among other examples) to a first authentication service (e.g., AuthN) executing on a computing system (e.g., a cloud computing system). In return, the authentication service provides a token (e.g., an OAuth token) to the client.

The client may then authenticate with the playback devices using the token. For instance, when performing a restricted action on a playback device, the client may send the token to the playback device. Example control protocols or APIs may utilize HTTP requests and responses. In such examples, the token may be transmitted using HTTP headers. The token authenticates the client (i.e., this client is who they say they are), but might not be configured with any additional information about the client's "role."

In role-based access control, a subject (e.g., the client) has a role on the object. In an example, the media playback system (and all constituent playback devices in the household) are the object. In such an example, the client may have a certain role with respect to all of the playback devices in the system. In other examples, the media playback system may be divided into two or more objects (e.g., based on rooms or zones configured within the media playback system). In this example, a client may have different roles in different zones (or may have the same role in all zones).

Within examples, the playback device may resolve a role for the client. A second authentication service (e.g., AuthZ) executing on a computing system (e.g., on a cloud computing system) may maintain token-to-role mappings to facilitate role resolution. For instance, after receiving a token from a client, the playback device may send the token to the second authentication service, which may return a set of effective roles for that token.

To reduce queries to the second authentication service, the playback device may maintain an edge data cache in data storage on the playback device that includes token-to-role mappings. After a successful query to the second authentication service, the playback device may store a received token-to-role mapping in the edge data cache. Then, when receiving the token again, the playback device may check the edge data cache first and, if the token-to-role mapping is in the edge data cache (i.e., a cache hit), the playback device may resolve the role using this mapping rather than querying the second authentication service. If the token-to-role mapping is not found in the edge data cache (i.e., a cache miss, perhaps because the mapping had expired or the mapping had not yet been queried), the playback device can query to second authentication service.

After resolving the role for the client on the subject, authorization management may further involve resolving permissions for the role. Within examples, the second authentication service (e.g., AuthZ) may maintain role-to-permissions mappings to facilitate permissions resolution. For instance, after receiving a role, the playback device may send the role to the second authentication service, which may return a set of permissions for that token. This role-to-permission mapping may be cached in the edge data cache, and used for subsequent permissions resolutions. Generally, by caching such data in an edge data cache and resolving roles and permissions at the edge, requests to the cloud may be reduced, which may ultimately reduce data transmission costs.

Example roles include owner and guest. In an example implementation, an owner role may have full permissions on their media playback system while a guest may have reduced roles. Since roles operate on subjects (e.g., media playback systems), a given client may have one role (e.g., owner) on their own media playback system and a different role (e.g., guest) on other media playback systems (e.g., a media playback system belonging to their friend).

The set of permissions may be in the form of a permissions mask with different integers in the mask represent permissions for different types of commands, similar to a Unix permissions mask. In an example, read permissions are represented using the '1' integer while read and modify permissions are represented using the '3' integer. In such an example, a guest role may have a 133 mask with the first digit corresponding to a "groups" namespace (representing permission to read but not modify groups), the second digit corresponding to a "playback" namespace (representing permission to read current playback status and modify the state), and the third digit corresponding to a "volume" namespace (representing permission to read current volume status and modify it).

In this example, role resolution and permissions resolutions are intentionally separated. To facilitate quick revocation of access, a subject-to-role mapping may have a relatively short time-to-live in the edge data cache. Moreover, in certain usage scenarios, such as a house party, retail, or hospitality business, there may be many concurrent subjects mapping to the same role (e.g., a guest role). In contrast, a role-to-permissions map is less likely to change frequently and may apply to a larger set of clients. As such, a cached role-to-permissions map may have a relatively longer time-to-live and may be able to avoid a relatively higher number of requests to the second authentication service.

After authenticating the client, resolving the role for that client, and resolving permissions for the client, the playback device may apply permissions. For instance, the playback device may determine whether the received playback command is permitted by the permissions for that client. For instance, following the example above, if the permission mask is 133 and the command is to change volume level, the playback device may determine based on the '3' digit in the volumes namespace that this client has permissions to change the volume. The playback device may then carry out the command.

As noted above, example techniques relate to authentication management in a media playback system. An example implementation involves a system comprising a first playback device, wherein the first playback device comprises, a network interface, at least one processor and data storage including instructions that are executable by the at least one processor such that the first playback device is configured to: receive, via the network interface, first data representing (i) a first playback command and (ii) a first token corresponding to a first client, wherein the first client and the playback device are connected to a local area network; determine that an edge data cache excludes a token-to-role mapping corresponding to the first token; send, via the network interface to the computing system, a request for a role corresponding to the first token, wherein the computing system is outside of the local area network; receive, via the network interface, a response to the request indicating a first token-to-role mapping that maps the first token to a first role; when the edge data cache excludes the token-to-role mapping corresponding to the first token, cache, in the edge data cache for a first time-to-live period, the first token-to-role mapping that maps the first token to the first role; determine that the edge data cache includes a first role-to-permission mapping corresponding to the first role, wherein the first role-to-permission mapping maps the first role to a first permission set; determine that the first playback command is permitted by the first permission set, and based on determining that the first playback command is permitted by the first permission set, carrying out the first playback command.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
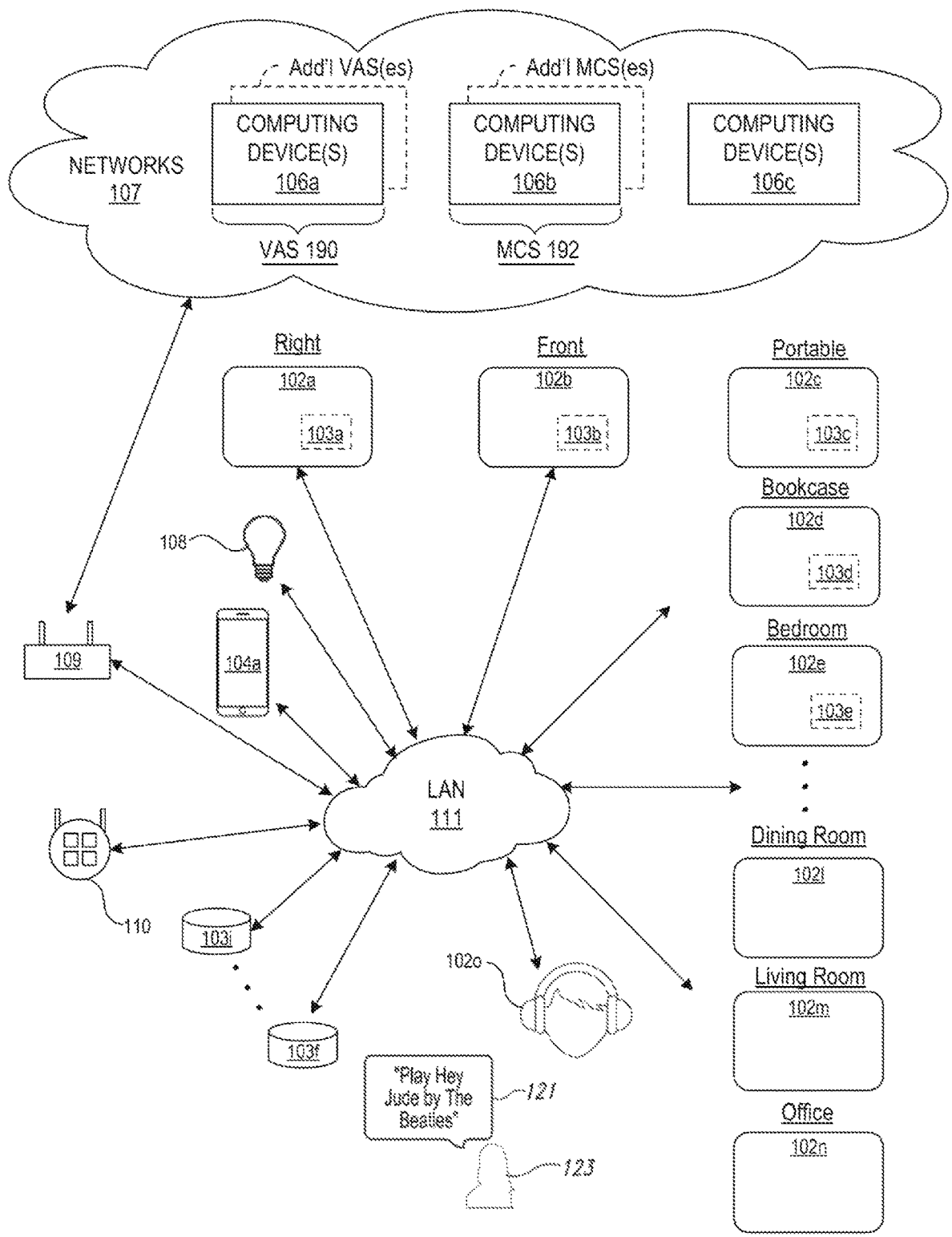
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102n), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A).

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") (i.e., the Internet), labeled here as the networks 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services. Media content services are also referred to herein as streaming audio services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the kitchen 101h (FIG. 1A) may be assigned to the dining room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
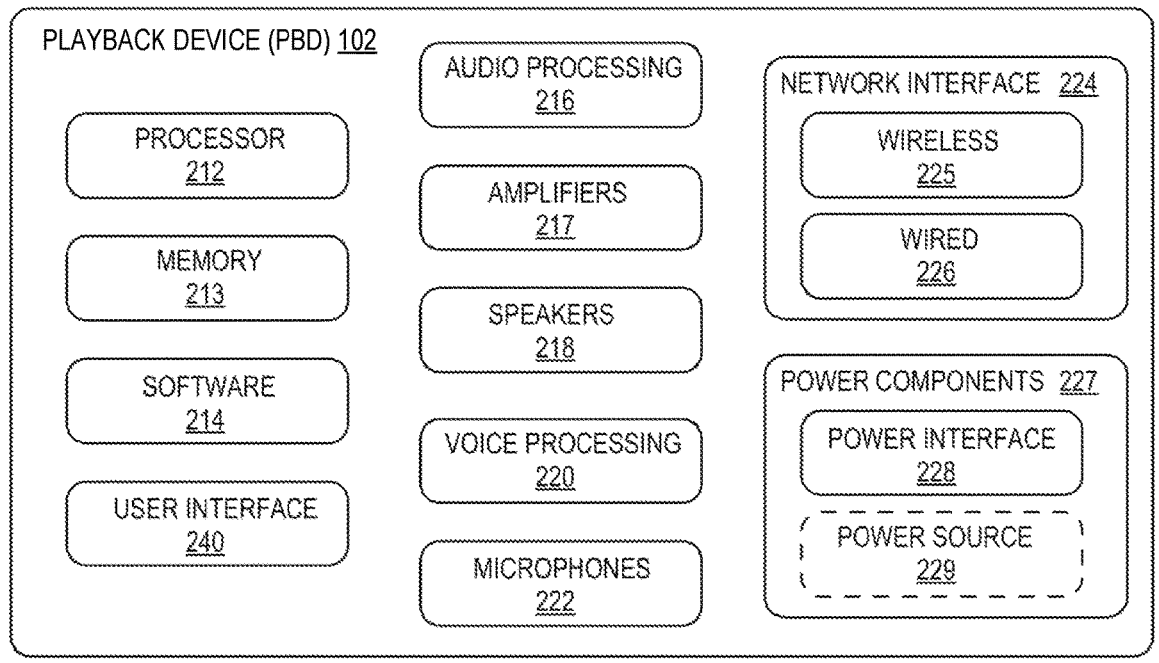
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

In another aspect, the software code 214 configures the playback device 102 to be operable in a plurality of non contemporary room sound modes. In each mode, the playback device 102 may adopt certain settings and/or configurations in accordance with the room sound mode. Further, the software code 214 may be configured to detect occurrence of various triggers corresponding to one of more of the room sounds, and responsively switch the first playback device from operating in one mode to operating in another mode. Further details related to the room sound modes are described in connection with section III below.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
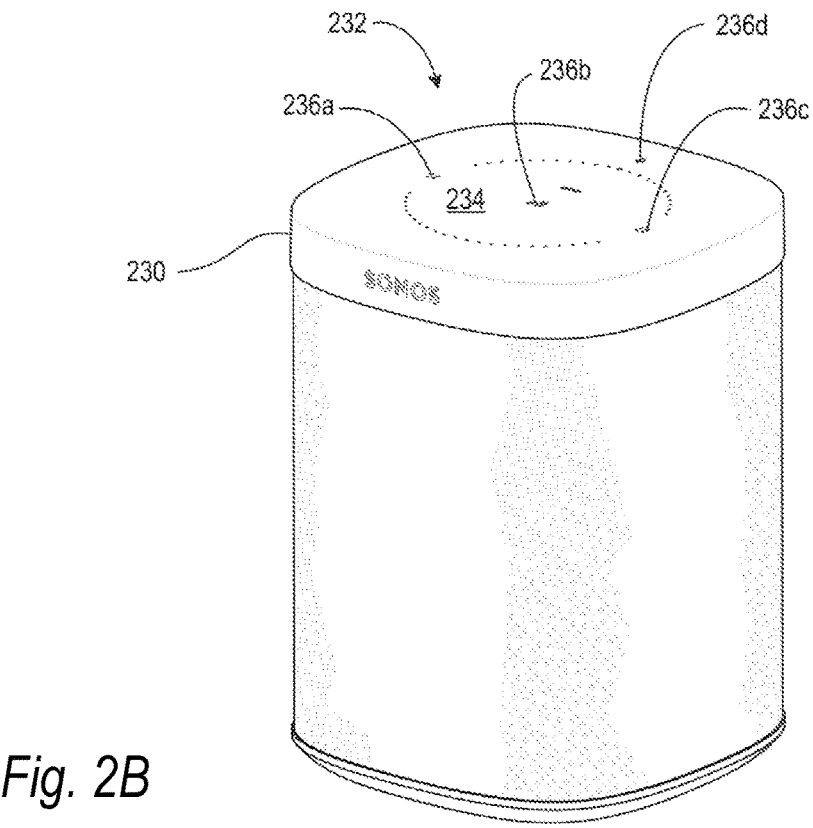
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
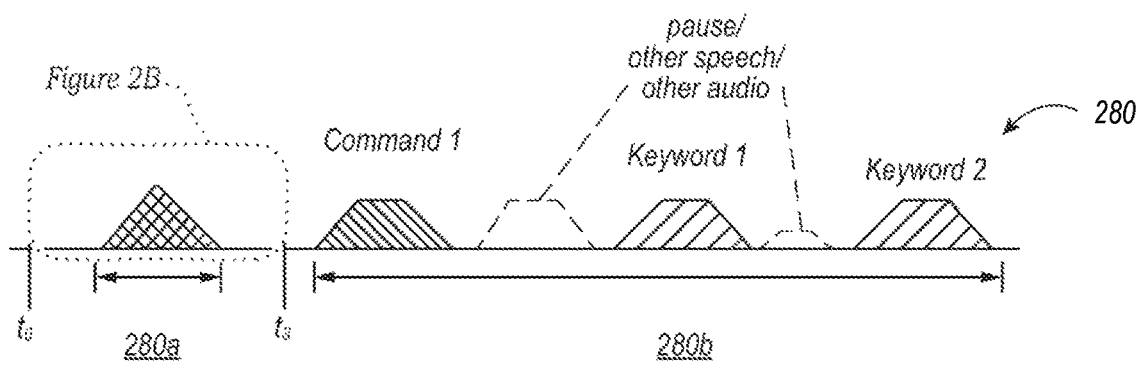
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. The keyword portion 280a may include a wake word or a command keyword. In the case of a wake word, the keyword portion 280a corresponds to detected sound that caused a wake-word The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords. A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
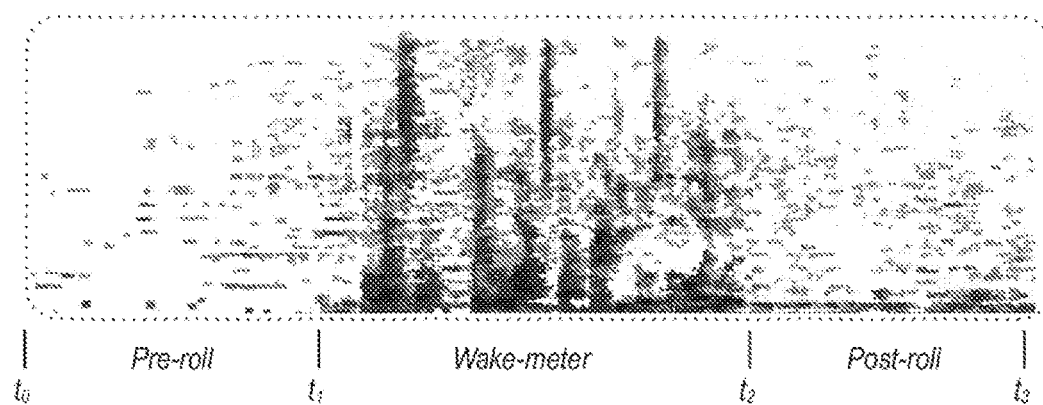
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for command keyword detection may be tuned to accommodate a wide range of keywords (e.g., 5, 10, 100, 1,000, 10,000 keywords). Command keyword detection, in contrast to wake-word detection, may involve feeding ASR output to an onboard, local NLU which together with the ASR determine when command word events have occurred. In some implementations described below, the local NLU may determine an intent based on one or more other keywords in the ASR output produced by a particular voice input. In these or other implementations, a playback device may act on a detected command keyword event only when the playback devices determines that certain conditions have been met, such as environmental conditions (e.g., low background noise).

The playback device 102 may further include a voice activity detector (VAD), which may be implemented as part of the voice processing components 220. The VAD is configured to detect the presence (or lack thereof) of voice activity in the sound-data stream from the microphones 222. In particular, the VAD may analyze frames corresponding to the pre-roll portion of the voice input 280a (FIG. 2D) with one or more voice detection algorithms to determine whether voice activity was present in the environment in certain time windows prior to a keyword portion of the voice input 280a.

The VAD may utilize any suitable voice activity detection algorithms. Example voice detection algorithms involve determining whether a given frame includes one or more features or qualities that correspond to voice activity, and further determining whether those features or qualities diverge from noise to a given extent (e.g., if a value exceeds a threshold for a given frame). Some example voice detection algorithms involve filtering or otherwise reducing noise in the frames prior to identifying the features or qualities.

In some examples, the VAD may determine whether voice activity is present in the environment based on one or more metrics. For example, the VAD can be configured to distinguish between frames that include voice activity and frames that don't include voice activity. The frames that the VAD determines have voice activity may be caused by speech regardless of whether it near- or far-field. In this example and others, the VAD may determine a count of frames in the voice input 280a that indicate voice activity. If this count exceeds a threshold percentage or number of frames, the VAD may be configured to output a signal or set a state variable indicating that voice activity is present in the environment. Other metrics may be used as well in addition to, or as an alternative to, such a count.

When the VAD detects voice activity in an environment, the VAD may set a state variable in the playback device indicating that voice activity is present. Conversely, when the VAD does not voice activity in an environment, the VAD may set the state variable in the playback device to indicate that voice activity is not present. Changing the state of this state variable may function as a mode trigger condition in some examples.

b. Example Playback Device Configurations

Figure 3B:
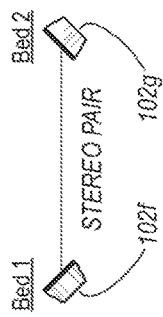
FIGS. 3A, 3B, 3C, 3D and 3E are diagrams showing example playback device configurations in accordance with aspects of the disclosure.
Figure 3C:
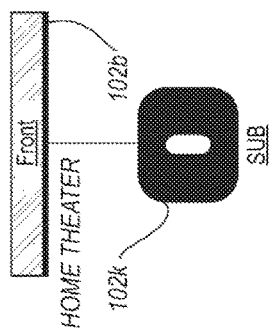
Figure 3D:
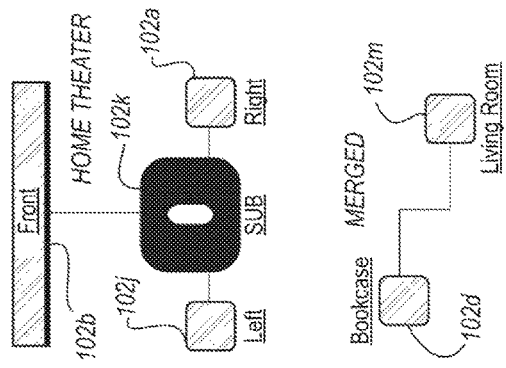
Figure 3E:
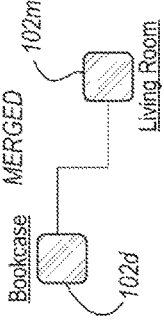
Figure 3A:
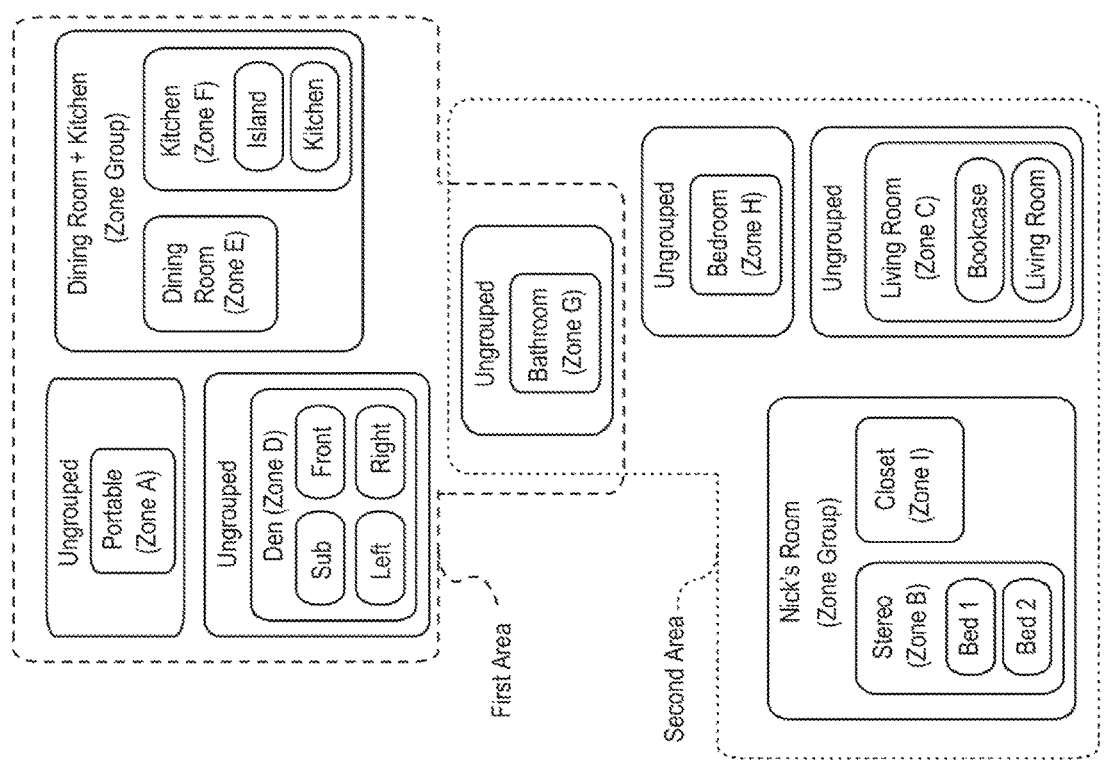

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*b* (FIG. 1A) and the Bed 2 device may be the playback device 102*g* also in the master bedroom 101*b* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
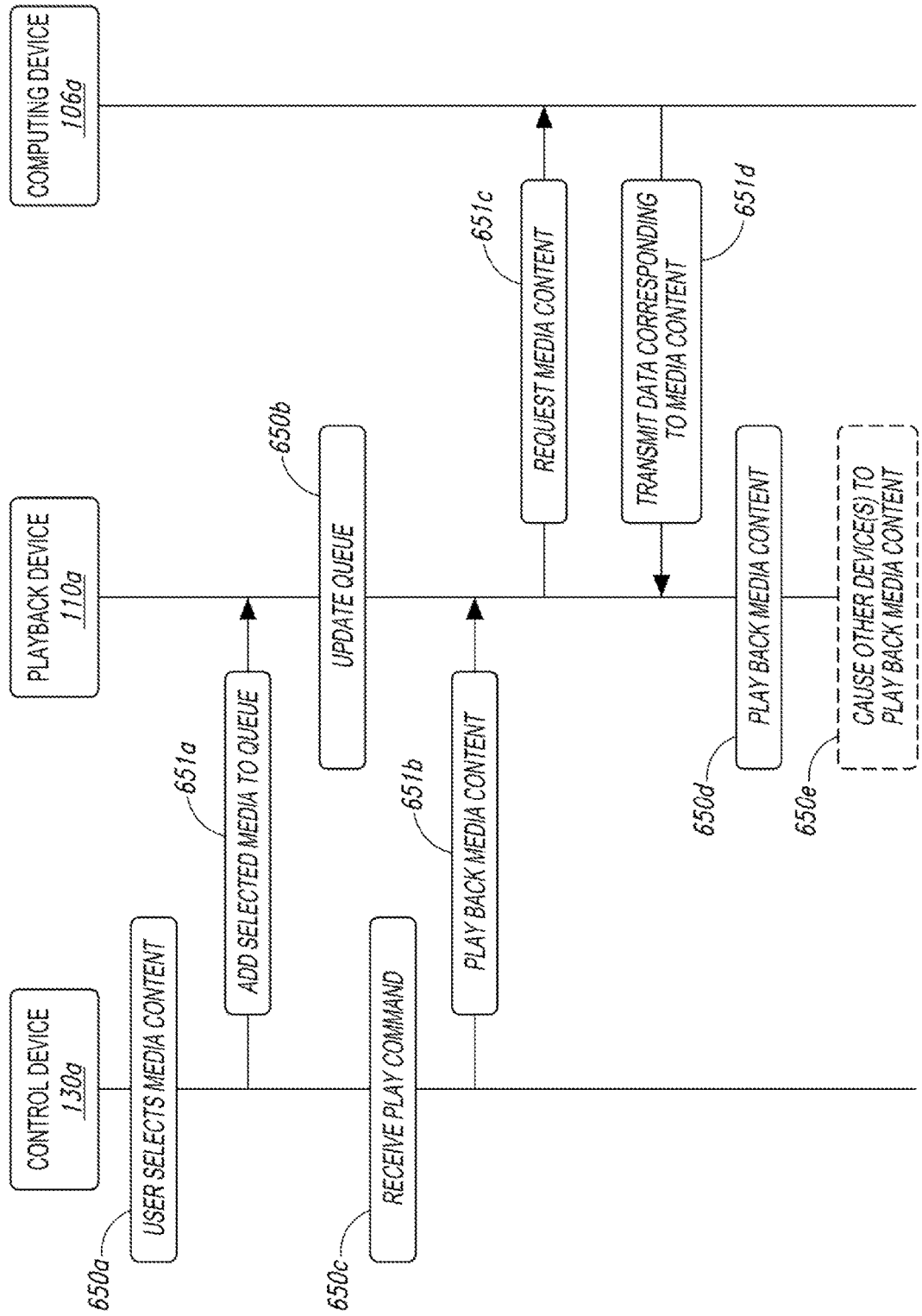
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

Within examples, such messages may conform to one or more protocols or interfaces (e.g., an Application Programming Interface). A platform API may support one or more namespaces that include controllable resources (e.g., the playback devices 102 and features thereof). Various functions may modify the resources and thereby control actions on the playback devices 102. For instance, HTTP request methods such as GET and POST may request and modify various resources in a namespace. Example namespaces in a platform API include playback (including controllable resources for playback), playbackMetadata (including metadata resources related to playback), volume (including resources for volume control), playlist (including resources for queue management), and groupVolume (including resources for volume control of a synchrony group), among other examples. Among other examples, such messages may conform to a standard, such as universal-plug-and-play (uPnP).

III. Example Authorization Management in a Media Playback System

Figure 7:
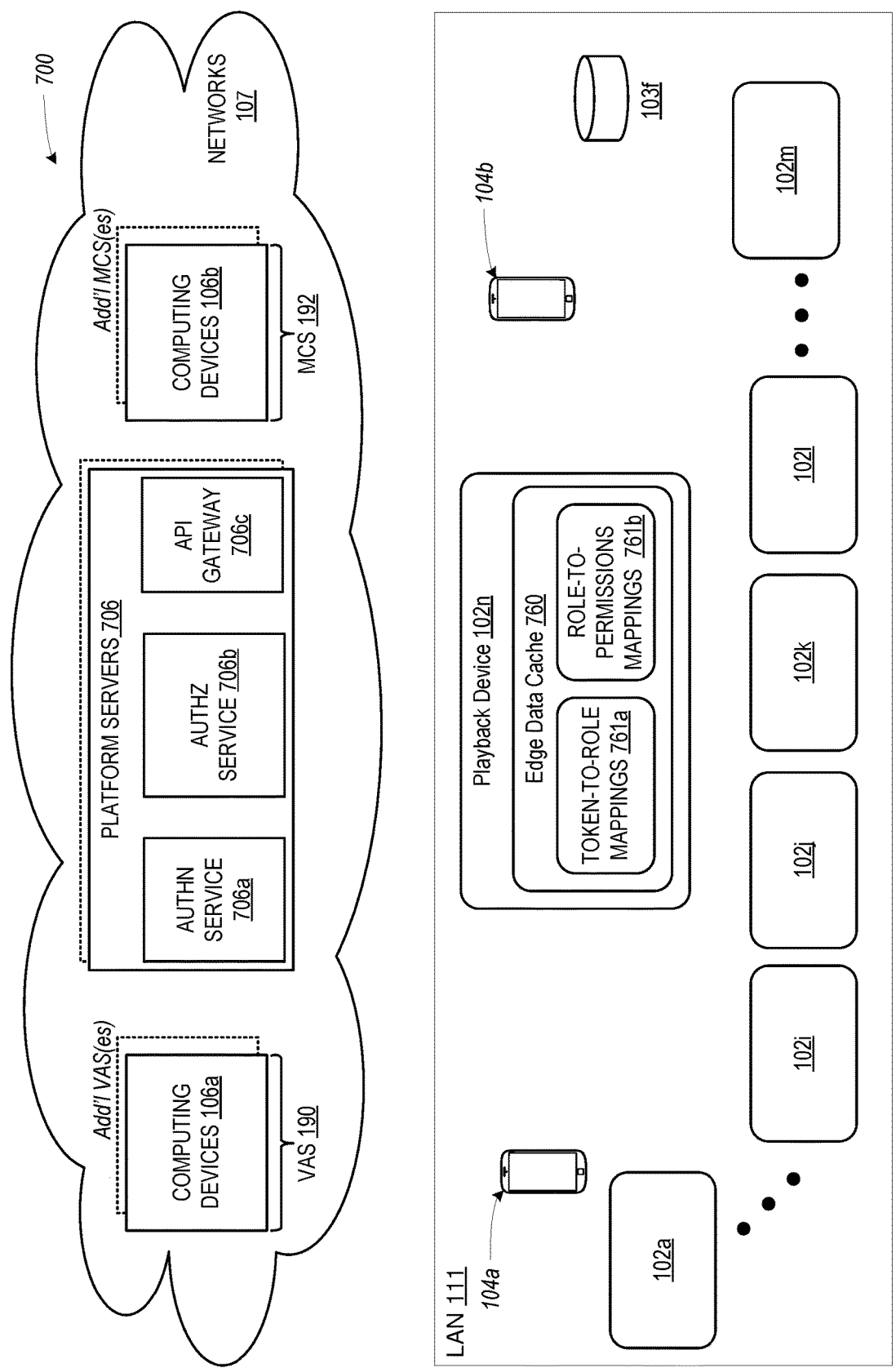
FIG. 7 is functional block diagrams illustrating an example authorization management architecture in accordance with aspects of the disclosed technology.

Example techniques described herein relate to authorization management in a media playback system. FIG. 7 is a functional block diagram illustrating an example architecture 700 to facilitate authorization management. The architecture 700 and its constituent devices is provided for purposes of illustration only, and other implementations may include different combinations of devices.

Shown in FIG. 7 are one or more platform servers 706. The platform servers 706 may provide one or more platform services that support the media playback system 100. In providing cloud-based platform services, the one or more platform servers 706 may operate as a cloud-based hub for a plurality of media playback systems 100 (e.g., with unique household identifiers, which may be registered to different users and/or located in different households), as well as other types of "smart home" systems and platforms. Within examples, the platform servers 706 may be self-hosted, or hosted using a cloud service provider (e.g., Amazon Web Services®), or may be representative of third-party computing systems that provide cloud services.

The platform servers 706 are located in the "cloud." That is, they are not on the LAN 111 and are instead connected to the networks 107 (FIG. 1B). Other computing systems in the cloud include the computing devices 106a (which provide the voice assistant service 190) (FIG. 1B) and also the computing devices 106b (which provide the MCS 192).

As shown, the platform servers 706 may provide a first authentication service 706a (illustrated as an AuthN service 706a) and a second authentication service 706b (represented as an AuthZ service 706b). The AuthN service 706a is an identify authentication service that is configured to receive user credentials (e.g., a user name/password, a pin, scanned token, client SSL certificate, among other examples) from a client and, if such user credentials are valid, provide an authorization token (e.g., an OAuth token) in response. The AuthZ service 706b is a service that provides information on the role and permissions that a client with a particular identity (i.e., the token) should be allowed to access.

FIG. 7 also shows examples of clients. In particular, a control device 104a is representative of an example of the control device 104 implemented using a mobile device and a media playback system control application (e.g., a first party control application). A control device 104b is representative of an example of the control device 104 implemented using a mobile device and a streaming audio service application (e.g., a third party streaming audio service application, such as a SPOTIFY®, PANDORA®, or APPLE MUSIC® app). A third possible client is an NMD 103f. Each of these example clients are configurable to control at least some features on the playback devices 102a-n (FIG. 1A).

For the purpose of illustration, FIG. 7 shows the playback device 102n as including an edge data cache 760. As described in more detail in the following sections, certain authorization data, such as token-to-role mappings 761a and/or role-to-permissions mappings 761b, may be cached to reduce interaction with the cloud. That is, instead of querying the platform services 706, certain queries may be handled by data stored in the edge data cache 760. By reducing queries to the AuthN service 706a and AuthZ service 706B, certain hosting related costs may be reduced. For instance, some third party hosting services may charge by the number of I/O requests made and a lower number of requests will result in lower hosting costs.

Within examples, the edge data cache 760 may be stored in a portion of the memory 213. Yet further, in some examples, the edge data cache 760 may be maintain in random access memory (RAM) to avoid write cycles on persistent flash data storage. Since the playback devices 102 are seldom powered-off (instead entering a low-power state when not in use), the cache can be maintained in RAM for sufficiently long periods.

Figure 8A:
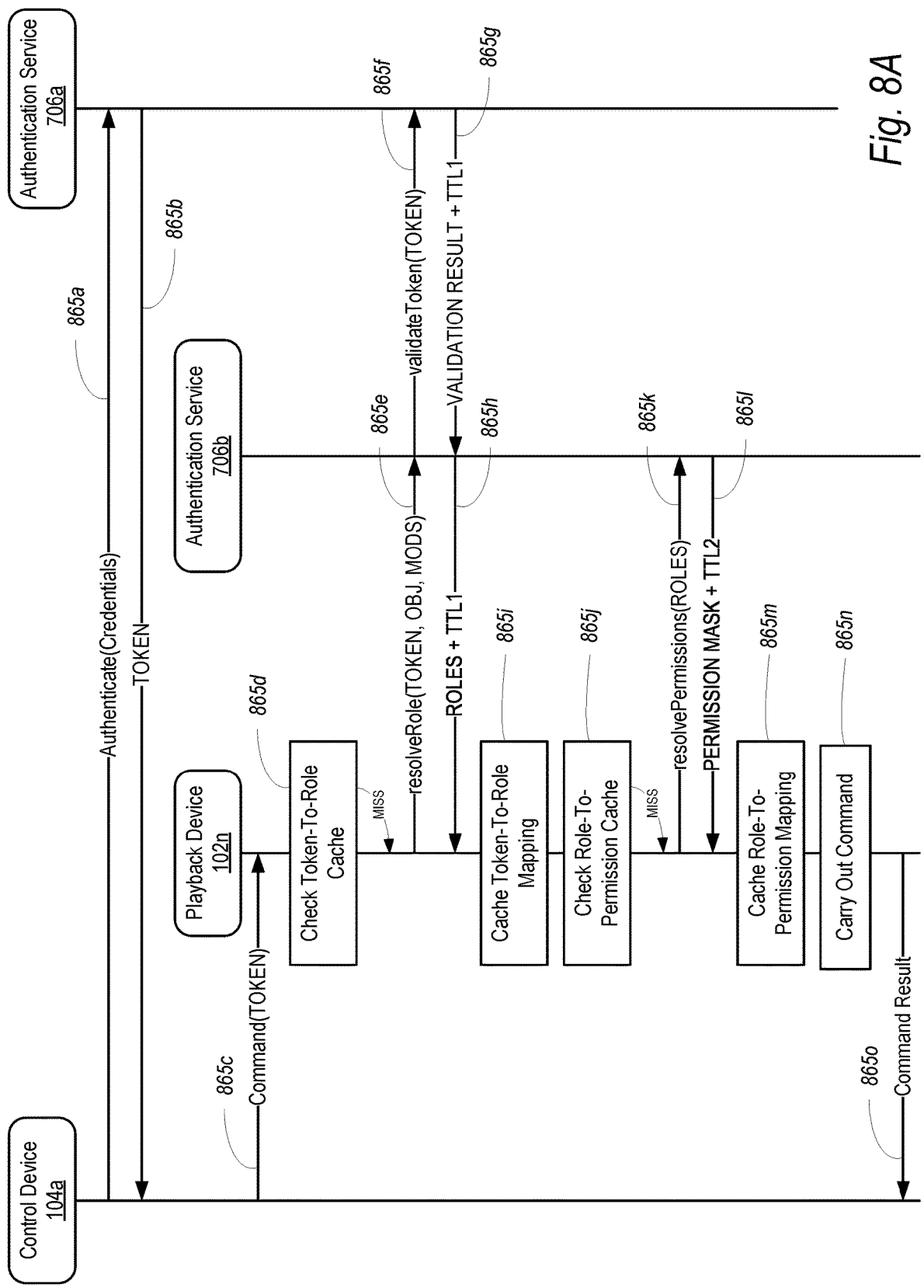

FIG. 8A is a message flow diagram illustrating data exchanges between devices shown the architecture 700 to perform authorization of a new client (the control device 104a). The message flow diagram begins with authenticating a client. At 865a, the control device 104a sends authentication credentials to the authentication service 706a. The authentication service 706a determines whether the authentication credentials are valid, and if so, sends a token to the control device 104a at 865b. This token is referred to in this example as a first token.

At 865c, the control device 104a sends a command to the playback device 102n. Example commands include various commands that direct the playback device to perform any of the example features described herein, as well as other features of playback devices. In an example, the commands may take the form of HTTP request methods such as GET and POST, which reference a resource in a namespace to get information about the resource or to set certain values of the resource. For instance, a POST request in a playback namespace may set a media item to play back.

Before performing a restricted action (e.g., via the command), the client authenticates with the playback device 102n. As shown in FIG. 8A, the command includes the first token. The first token may be referenced in a header (e.g., an HTTP header) possibly along with other information to facilitate the command. This token may be used to authenticate the client with the playback device 102n.

After receiving such a command, the playback device 102n attempts to resolve the role(s). In particular, at 865d, the playback device 102n checks a token-to-role cache. For instance, the playback device 102n may determine whether the edge data cache 760 includes or excludes a token-to-role mapping corresponding to the first token (e.g., in the token-to-role mappings 761a) (FIG. 7). Based on determining that the edge data cache 760 excludes a token-to-role mapping corresponding to the first token (i.e., a cache miss), the playback device 102n goes to the cloud to attempt to resolve the roles.

In particular, at 865e, the playback device 102n sends a request for a role corresponding to the first token to the authentication service 706b. As illustrated in FIG. 8A, the request includes indications of the first token, the object (e.g., the media playback system 100, or the playback device 102n, depending on scope), and any modifiers. The request may take the form of a HTTP POST request with the indications carried in a header. An example POST request to resolve roles is shown as follows:

```
POST /authz/v1/role/resolve HTTP/1.1
...
{
   "token": "OAUTH TOKEN",
   "objectId": "012345ABCDEF", // serial number
   "objectType": "player",
   "attributes": { // attributes can be expanded
      "route": "lan", // lan|wan|bluetooth
      "openLanEnabled": true //
   }
}
```

As shown, the HTTP header of the POST request includes an OAuth token, an objectID (indicating the serial number of the playback device 102n), an objectType (including that it's a player, or playback device), as well as some attributes. As discussed in further detail below, such attributes may modify the permissions granted to a role.

At 865*f*, the authentication service 706*b* sends a request to validate the first token to the authentication service 706*a*. Then, at 865*g*, the authentication service 706*a* replies with a validation result. If the first token is valid, the validation result indicates that the first token is valid and also provides an indication of a first time-to-live period (denoted as "TTL1"). This first time-to-live period indicates how long the authentication token remains valid. After a time-to-live period expires, the associated cached data is considered stale and cannot be used to resolve roles.

When the validation result is successful, the authentication service 706*b* determines the token-to-role mapping for the first token. The authentication service 706*b* maintains or has access to token-to-role mappings for each token. The authentication service 706*b* may act as a "source of truth" for such mappings in the authentication system.

Such mappings may be created via a client having certain permissions (e.g., administrator or owner permissions) using a suitable user interface (e.g., the user interface 440 in FIG. 4) in order to assign certain users and/or their respective client devices to specific roles within the media playback system 100. In some examples, some clients may be unknown or anonymous such that there is no mapping for that client. In such examples, the clients may be automatically assigned to a specific role (e.g., guest). Such clients may be latter elevated to a different role via the user interface.

Within examples, determining the token-to-role mapping for the first token may involve querying a database or other data storage structure for a role matching the object and the token. Such a query may return an indication of the role(s) corresponding to the token on the object. An indication of such roles may be ultimately provided to the playback device 102*n* in a response.

In further examples, the role(s) may be modified based on one or more modifiers. One example of a modifier is the route of the client command. As illustrated above in the example POST request to resolve roles, example values of the route modifier include LAN, WAN, and Bluetooth. Commands arriving via the LAN and/or Bluetooth routes may be modified to a relatively higher role, as connection via such routes is generally more trustworthy than a WAN route (e.g., from a guest to an owner role). That is, a client on a secure LAN or a Bluetooth connection is more likely to be a trusted client than a client attempting to connect via the broader internet. In other examples, all three routes may modify the role differently. For instance, a LAN route may modify the role to a higher role, the Bluetooth route might not modify the role, and the WAN route may lower the role. Many examples of different modifications based on the routes are contemplated.

At 865*h*, the authentication service 706*b* sends a response to the playback device 102*n*. If the first token is valid, the response will indicate a success. An example successful response is shown as follows:

```
HTTP/1.1 200 OK
Cache-Control: private,max-age=300,stale-whilerevalidate=
30,stale-if-error=300
ETag: 8ccsefca3640bf81a1e10j2w72d98rbn
Content-Type: application/json
. . .
{
```

-continued

```
"status": "OK",
"uid": "asdfghjkl", // okta user id
"luid": "12345", // the legacy user id,
"apiKey": "DED3E12F-AE8A-45BC-BFB6-A91C80D87EC7",
"policyKey": "8dLS-STphqyG__fezbJS83zK-7BU"
}
```

As shown, the response indicates "OK" as the "status" representing a successful response to the request to resolve roles. The HTTP header also includes a policyKey which indicates the role(s) corresponding to the first token. This role is referred to herein as a first role.

The HTTP header of the response also includes information to facilitate caching. In particular, the header indicates the first time-to-live period, which in this example is 300 seconds. The header also includes an entity tag ("ETag") to identify the particular version of the resource (e.g., the policyKey). As explained in further detail below, the ETag may be used to determine whether the policyKey has been changed (and thus needs to be re-requested from the authentication service 706*b*).

At 865*i*, the playback device 102*n* caches the token-to-role mapping in the edge data cache 760 (e.g., in the token-to-role mapping 761*a*). In some examples, the caching is maintained for the first time-to-live period and removed from the cache when this period expires. In other examples, the caching is considered valid for the first time-to-live period (and can't be used to resolve roles after invalidated as it is considered stale). In either case, the cached token-to-role mapping may be used to resolve roles for the first time-to-live period. As explained further below, certain requests may refresh the cache.

After resolving the role(s), the playback device 102*n* may next attempt to resolve permissions. At 865*j*, the playback device 102*n* checks a role-to-permission cache. For instance, the playback device 102*n* may determine whether the edge data cache 760 includes or excludes a role-to-permission mapping corresponding to the first token (e.g., in the role-to-permission mappings 761*b*) (FIG. 7). Based on determining that the edge data cache 760 excludes a token-to-role mapping corresponding to the first role (i.e., a cache miss), the playback device 102*n* goes to the cloud to attempt to resolve the permissions.

In particular, at 865*k*, the playback device 102*n* sends a request to the authentication services 706*b* to resolve the permissions. As illustrated in FIG. 8A, the request includes an indication of the first role. The request may take the form of a HTTP GET request. An example GET request to resolve permissions is shown as follows:

```
GET /authz/v1/policy
/8dLSSTphqyG__
fezbJS83zK-
7BU HTTP/1.1
. . .
```

As shown, the HTTP GET request includes the policyKey as an indication of the resolved role.

Within examples, determining the role-to-permission mapping for the first role may involve querying a database or other data storage structure for a permission set matching the role. Such a query may return an indication of the permission set corresponding to the role. An indication of such permissions may be ultimately provided to the playback device 102*n* in a response.

At 865*l*, the authentication service 706*b* sends a response to the request to resolve permissions. The response includes an indication of the permissions set corresponding to the first role. In this example, the permissions set in in the form of a permissions mask. The response also includes an indication of a second time-to-live period (TTL2), which indicates how long the permissions mask for the first role remains valid. An example successful response is shown as follows:

```
HTTP/1.1 200 OK
Cache-Control: public,max-age=86400,stale-while-
revalidate=43200,stale-if-error=43200
ETag: 6ccceca3640bf81a1e10135e3d286b8c
Content-Type: application/json
. . .
[
    {"namespace": "groupVolume", "permissions": 3},
    {"namespace": "playback", "permissions": 5},
    {"namespace": "playbackMetadata", "permissions": 1},
    {"namespace": "volume", "permissions": 3},
    {"namespace": "playlist", "permissions": 7},
    // . . .
]
```

As shown, the response includes a map of namespaces to permissions bitmasks. Here the integers in the mask represent permissions for different types of commands within a namespace, similar to a Unix permissions mask.

More particularly, a namespace may define a bit-position-to-permission order within the bitmask. For instance, a "playlist" namespace (including playlist resources) may define a bit-position-to-permission as "create," "read," "update," "delete" and "load" permissions corresponding to the least significant bit to the most significant bit, respectively. An HTTP example is as follows:

```
<muse-namespace name="playlists"
>
    <!-- . . . -->
    <permissions>
        <!-- Least-significant bit
    -->
        <permission name="CREATE"/>
        <permission name="READ"/>
        <permission name="UPDATE"/>
        <permission name="DELETE"/>
        <permission name="LOAD"/>
        <!-- Most-significant bit -->
    >
    </permissions>
</muse-namespace>
```

In this example, a permissions mask of "18" represents permissions to READ and LOAD, but not to CREATE, UPDATE, or DELETE. Such permission as represented as follows:

```
18 (dec) 10010 (bin)
    0 (LSB) PLAYLIST::CREATE
    1 PLAYLIST::READ
    0 PLAYLIST::UPDATE
    0 PLAYLIST::DELETE
    1 (MSB) PLAYLIST::LOAD
```

As another example, a permissions mask of "31" (or "11111" in binary) in the "playlist" namespace represents permissions to CREATE, READ, UPDATE, DELETE, and LOAD, which would be representative of full (e.g., owner or administrator) permissions.

The HTTP header of the response also includes information to facilitate caching. In particular, the header indicates the second time-to-live period, which in this example is 86400 seconds. The header also includes an ETag to identify the particular version of the resource (e.g., the permissions mask). As explained in further detail below, the ETag may be used to determine whether the permissions mask has been changed (and thus needs to be re-requested from the authentication service 706*b*).

In some implementations, role resolution and permissions resolution are intentionally separated into separate requests, as they have different usage patterns and requirements. To facilitate quick revocation of access (e.g., of guests), a subject-to-role mapping may have a relatively short time-to-live in the edge data cache 760. In contrast, a role-to-permissions map is less likely to change frequently and so may be cached for a longer period. To illustrate, the example first time-to-live period for the token-to-role mapping is much shorter (300 seconds) than the example second time-to-live period for the role-to-permissions mapping (86400 seconds).

Each token-to-role mapping is unique to each client, whereas many clients may have the same role, which maps to the same permissions. As such, in certain usage scenarios, such as a house party, retail, or hospitality business, there may be many clients with unique tokens but the same role. As such, as unique guests come and go, the role-to-permissions mappings in the edge data cache 760 may be hit relatively more often (e.g, for the same guest role) as compared with the token-to-role mappings. As such, in at least these usage patterns, caching role-to-permissions mappings may avoid relatively more server requests as compared with the token-to-role mappings. Some implementations might not utilize token-to-role mappings and instead rely only on role-to-permissions mappings as cache hits are less likely in the token-to-role mappings.

At 865*m*, the playback device 102*n* caches the role-to-permissions mapping in the edge data cache 760 (e.g., in the role-to-permissions mappings 761*b*). In some examples, the caching is maintained for the second time-to-live period and removed from the cache when this period expires. In other examples, the caching is considered valid for the second time-to-live period (and can't be used to resolve permissions after invalidated as it is considered stale). In either case, the cached role-to-permissions mapping may be used to resolve roles for the second time-to-live period. Like other cached data, some types of requests may refresh this cached data.

Once the playback device 102*n* has the permissions set, the playback device 102*n* may determine whether to accept or reject the command. That is, the playback device 102*n* may determine that the command is permitted by the resolved permission set and carry out the command at 865*n*. Conversely, the playback device 102*n* may determine that the command is prohibited by the resolved permission set and not carry out the command.

To illustrate, following the above example, when the command attempts to read or modify a resource in a given namespace (e.g., is a command to change volume in a "volume" namespace), the playback device 102*n* may determine whether the bitmask integer for that namespace in the permissions mask allows that client to modify volume on that object (i.e., the playback device 102*n*). If the command is permitted, the command is carried out.

When the playback device 102*n* is in a group (e.g., a zone group (FIG. 3E) or a bonded zone (FIGS. 3A-3D), the command may operate on multiple playback devices (e.g., all playback devices in the group. For instance, a command modifying the "playback" namespace may change playback on all playback devices 102 in a group. However, some commands might operate individually. For instance, a command modifying the "volume" namespace may change volume an individual playback device 102 (as compared with a command modifying the "groupVolume" namespace, which may modify the volume of the group as a whole).

Within examples, at 865o, the playback device 102n may provide a command result to the control device 104a. The command result indicates whether the command was carried out and may also indicate current resource states following the command (which may be updated if the command modified the resource). For instance, if the volume resource was modified to a different volume level, the command result may indicate the new volume level.

When receiving the command result, the control device 104a may update a user interface (e.g., the control interfaces 540) to indicate the result of the command. For instance, if the command was carried out, a control corresponding to the corresponding resource (e.g., a volume slider) may be updated to indicate the modified volume level. If the command was not carried out, an indication of this result may be explicitly indicated (e.g., by graying out or otherwise modifying an associated control, or an explicit message indicating that the user cannot perform this command).

FIG. 8B is another message flow diagram illustrating data exchanges between devices shown the architecture 700. The message flow diagram of FIG. 8B represents a message flow that may occur after a client is authenticated and mappings are cached in the edge data cache 760. Further, in this example, the control device 104a already has a valid token (e.g., the first token of the FIG. 8A example).

At 866a, the control device 104a sends a command to the playback device 102n. Before performing a restricted action (e.g., via the command), the client authenticates with the playback device 102n. As shown in FIG. 7A, the command includes the first token, which as noted above may be used to authenticate the client with the playback device 102n.

After receiving such a command, the playback device 102n attempts to resolve the role(s). In particular, at 866b, the playback device 102n checks a token-to-role cache. For instance, the playback device 102n may determine whether the edge data cache 760 includes or excludes a token-to-role mapping corresponding to the first token (e.g., in the token-to-role mappings 761a) (FIG. 7). Based on determining that the edge data cache 760 includes a token-to-role mapping corresponding to the first token (i.e., a cache hit), the playback device 102n resolves the role using the cached token-to-role mapping. Continuing the FIG. 8A example, using the cached token-to-role mapping, the playback device 102n may resolve the first token to the first role (e.g., as indicated by the policyKey) resolved in the FIG. 8A example.

After resolving the roles, the playback device 102n attempts to resolve the permissions set corresponding to the first role. At 866c, the playback device 102n checks the role-to-permissions cache. For instance, the playback device 102n may determine whether the edge data cache 760 includes or excludes a role-to-permissions mapping corresponding to the first role (e.g., in the role-to-permissions mappings 761b) (FIG. 7). Based on determining that the edge data cache 760 includes a role-to-permissions mapping corresponding to the first role (i.e., a cache hit), the playback device 102n resolves the permissions set using the cached role-to-permissions mapping. Continuing the FIG. 8A example, using the cached token-to-role mapping, the playback device 102n may resolve the first role to the first permissions sest (e.g., as indicated by the permission mask) resolved in the FIG. 8A example.

Similar to the FIG. 8A example, after resolving the permissions set, the playback device 102n may determine whether to accept or reject the command. That is, the playback device 102n may determine that the command is permitted by the resolved permission set and carry out the command at 866d. Conversely, the playback device 102n may determine that the command is prohibited by the resolved permission set and not carry out the command.

At 866e, the playback device 102n may provide a command result to the control device 104a. The command result indicates whether the command was carried out and may also indicate current resource states following the command (which may be updated if the command modified the resource). When receiving the command result, the control device 104a may update a user interface (e.g., the control interfaces 540) to indicate the result of the command.

In some cases, the edge data cache 760 includes a mapping but the cached data is stale. For instance, the role-to-permission cache may include a role-to-permission mapping corresponding to the first role, but the corresponding second time-to-live period is expired, thereby indicating that the cached data is stale. In such cases, the playback device 102n may send a conditional request (e.g., an HTTP request with an if-modified-since HTTP header) indicating the ETag of the cached role-to-permission mapping.

If the role-to-permission mapping has not changed (as indicated by the ETag of the cached role-to-permission mapping matching the ETag of the role-to-permission mapping at the authentication service 706b, the authentication service 706b can respond with a particular status (e.g., 200 status) indicating that the cached data is still the same. Here, the authentication service 706b does not have to send the body (including the permission mask) and instead sends only the header, thereby minimizing data transmission traffic and accordingly saving on data transmission costs.

To illustrate, FIG. 8C is another message flow diagram illustrating data exchanges between devices shown in architecture 700 to perform authorization of another client (the control device 104b) (FIG. 7). The message flow diagram begins with authenticating a client. At 867a, the control device 104b sends authentication credentials to the authentication service 706a. The authentication service 706a determines whether the authentication credentials are valid, and if so, sends a token to the control device 104b at 867b. This token is referred to in this example as a second token.

At 867c, the control device 104a sends a command to the playback device 102n. Before performing a restricted action (e.g., via the command), the client authenticates with the playback device 102n. Here, the command includes the second token. Like the first token, the second token may be referenced in a header (e.g., an HTTP header) possibly along with other information to facilitate the command. This second token may be used to authenticate the second client with the playback device 102n.

After receiving such a command, the playback device 102n attempts to resolve the role(s). In particular, at 867d, the playback device 102n checks the token-to-role cache. For instance, the playback device 102n may determine whether the edge data cache 760 includes or excludes a token-to-role mapping corresponding to the second token (e.g., in the token-to-role mappings 761a) (FIG. 7). Based on determining that the edge data cache 760 excludes a token-to-role mapping corresponding to the second token (i.e., a cache miss), the playback device 102n goes to the cloud to attempt to resolve the roles.

In particular, at 867e, the playback device 102n sends a request for a role corresponding to the second token to the authentication service 706b. As illustrated in FIG. 8C, the request includes indications of the second token, the object (e.g., the media playback system 100, or the playback device 102n, depending on scope), and any modifications. The request may take the form of a HTTP POST request with the indications carried in a header.

At 867f, the authentication service 706b sends a request to validate the second token to the authentication service 706a. Then, at 867g, the authentication service 706a replies with a validation result. If the second token is valid, the validation result indicates that the second token is valid and also provides an indication of the first time-to-live period (denoted as "TTL1"). Note that this first time-to-live period may be the same duration as the first time-to-live period for the first token (or may be set differently, perhaps based on the type of client). For instance, a token for a client that has third-party software may be validated a different (e.g., shorter) time-to-live period.

When the validation result is successful, the authentication service 706b determines the token-to-role mapping for the second token. As explained above, the authentication service 706b maintains or has access to token-to-role mappings for each token. Within examples, determining the token-to-role mapping for the second token may involve querying a database or other data storage structure for a role matching the object and the second token. Such a query may return an indication of the role(s) corresponding to the second token on the object. An indication of such roles may be ultimately provided to the playback device 102n in a response.

At 867h, the authentication service 706b sends a response to the playback device 102n. If the second token is valid, the response will indicate a success and the resolved role mapping. In this example, the resolved role corresponding to the second token is referred to as a second role.

At 867i, the playback device 102n caches the token-to-role mapping in the edge data cache 760 (e.g., in the token-to-role mapping 761a). In some examples, the caching is considered stale after expiration of the first time-to-live period. If the cache is stale, the cached data cannot be used unless a conditional request to the authentication service 706b (e.g., an if-modified-since HTTP request) indicates that the cached data is still up-to-date.

After resolving the role(s), the playback device 102n next attempts to resolve permissions. At 867j, the playback device 102n checks a role-to-permission cache. For instance, the playback device 102n may determine whether the edge data cache 760 includes or excludes a role-to-permission mapping corresponding to the second token (e.g., in the role-to-permission mappings 761b) (FIG. 7). Based on determining that the edge data cache 760 includes a token-to-role mapping corresponding to the second role (i.e., a cache hit) but that the cached data is stale (e.g., because a time-to-live period has expired), the playback device 102n goes to the cloud to attempt to resolve the permissions.

In particular, at 867k, the playback device 102n sends a conditional request to the authentication services 706b to resolve the permissions. As illustrated in FIG. 8A, the request includes an indication of the second role and an indication of a version of the cached role-to-permission mapping corresponding to the second role. The request may take the form of a HTTP if-modified-since request including an ETag indicating the cached version.

When receiving such a request, the authentication service 706b may determine whether the stale cached version of the role-to-permission mapping is still up-to-date. The authentication service 706b may make such a determination by comparing the ETag of the cached version of the role-to-permission mapping with an ETag of the version of the role-to-permission mapping at the authentication service 706b. As noted above, the ETags act as a fingerprint of the version. If the ETags match, no change has been made to the role-to-permission mapping. If the ETags are different, the version of the role-to-permission mapping at the authentication service 706b has changed and authentication service 706b responds to the request with the new mappings.

However, when the ETags match, the authentication service 706b can avoid sending the mappings and can instead respond only with an indication that the cached data previously considered stale is still valid. Such a response may take the form of an HTTP status (e.g., 200 OK) and no body (as the mappings themselves are not necessary). To illustrate, at 867l, the authentication service 706b sends a response to the request to resolve permissions indicating a status (e.g., 200 OK) and an indication of a third time-to-live period (TTL3), which indicates how long the permissions mask for the first role remains valid. In some examples, this time-to-live period may be the same length of time as the second time-to-live period.

At 867m, the playback device 102n re-caches the role-to-permissions mapping in the edge data cache 760 (e.g., in the role-to-permissions mappings 761b). As noted above, in some examples, the caching is maintained for the second time-to-live period and considered expired after the second time-to-live period. In other examples, the caching is removed from the cache after the second time-to-live period. In either case, the cached role-to-permissions mapping may be used to resolve roles for the second time-to-live period.

Once the playback device 102n has the permissions set, the playback device 102n may determine whether to accept or reject the command. That is, the playback device 102n may determine that the command is permitted by the resolved permission set and carry out the command at 867n. Conversely, the playback device 102n may determine that the command is prohibited by the resolved permission set and not carry out the command.

Within examples, at 867o, the playback device 102n may provide a command result to the control device 104b. The command result indicates whether the command was carried out and may also indicate current resource states following the command (which may be updated if the command modified the resource). When receiving the command result, the control device 104b may update a user interface to indicate the result of the command.

In traditional HTTP caching, a client (e.g., a web browser) caches data from a web server. In contrast, while the example authentication management may utilize features of HTTP caching during authentication management, the playback device 102 including the cache (e.g., the playback device 102n) is caching data on itself to respond to commands (which may take the form of HTTP requests) from one or more clients. That is, as illustrated in FIGS. 8B and 8C, the playback device 102n may act as an edge server itself to avoid calls to cloud services such as the authentication service 706a and the authentication service 706b. In other words, the playback device 102 operates as a hybrid client and server within the architecture 700.

In some cases, the playback devices 102 may support two or more different types of commands. For instance, the playback devices 102 may support a legacy API (e.g., universal plug- and play) and a platform API. As another example, the playback devices may support platform API and one or more third-party (APIs), such as Airplay® or Spotify Connect®.

In such examples, the playback devices 102 may receive a first command according to a first API (e.g., a third party or legacy API) and map the first command to a corresponding command in another API (e.g., the platform API). After mapping, the playback devices 102 may determine whether the corresponding command is permitted by the permission set. Such an implementation may avoid having to implement permissions sets for all supported APIs.

In some instances, the first command according to the first API may map to two or more second commands in the second API. In such examples, determine whether the first command is permitted by a permission set may involve determining whether each of the two or more second commands are permitted. For instance, a playback command targeting two or more playback devices in the first API may map to a grouping command and a group playback command in the second API. Many other examples are possible.

Figure 9A:
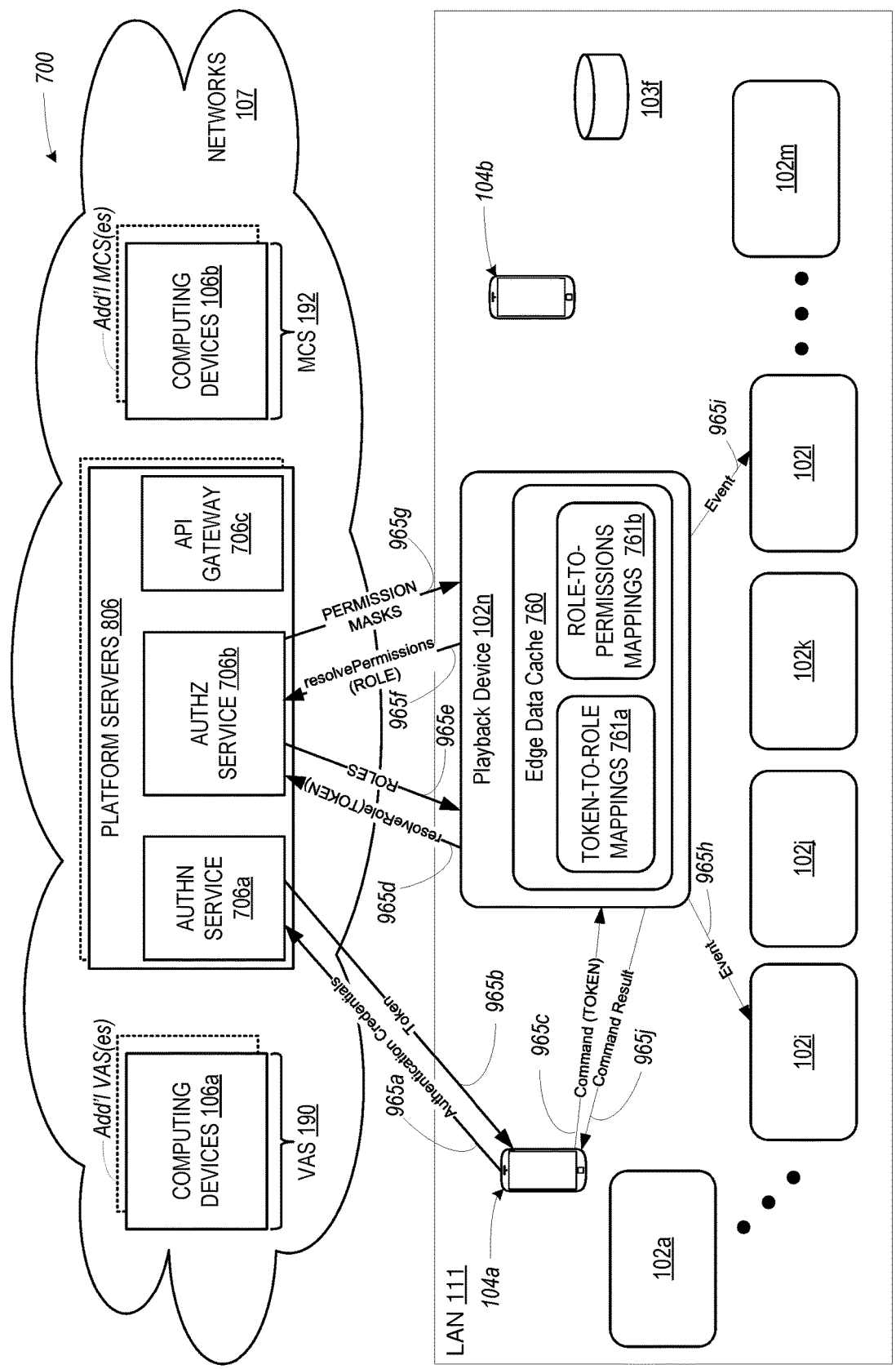
FIGS. 9A, 9B, and 9C are functional block diagrams illustrating example authorization management in accordance with aspects of the disclosed technology.
Figure 9B:
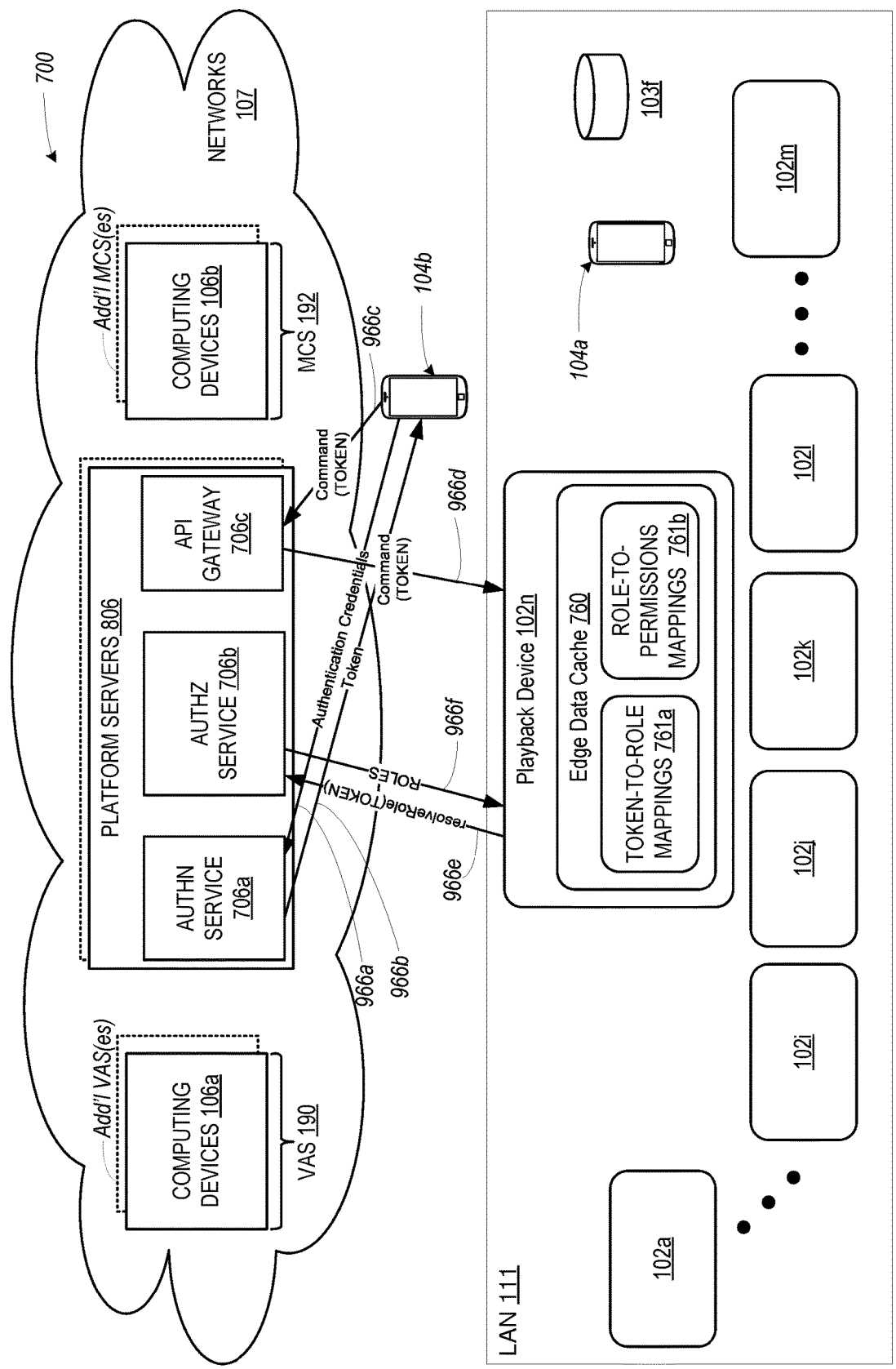
Figure 9C:
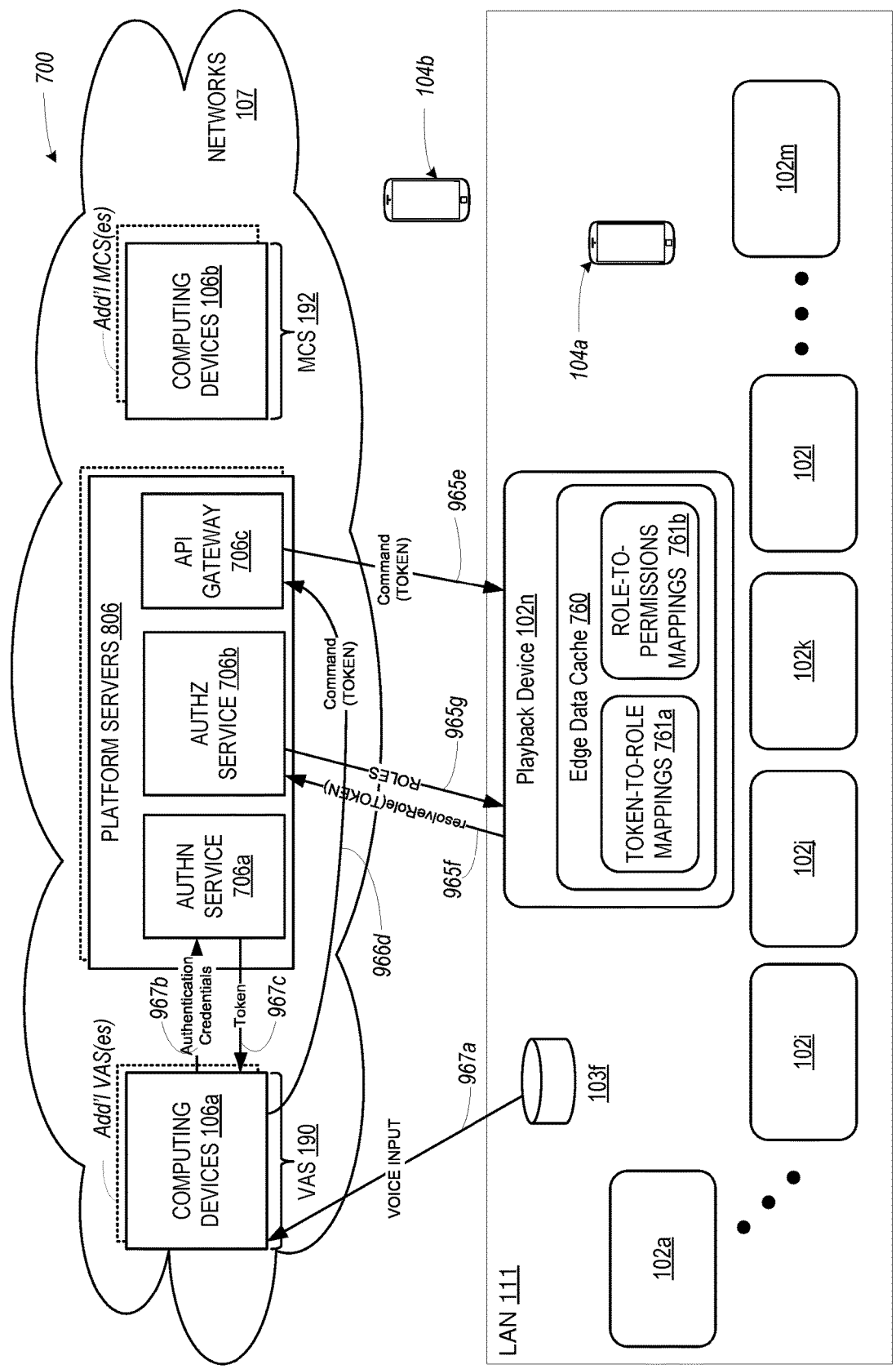

To provide further illustration, FIGS. 9A-9C are functional block diagrams showing examples in the example architecture 700 (FIG. 7). Such examples are intended to be representative of authentication management with various clients. Such techniques may be applied using different architectures and clients.

FIG. 9A is an example of authenticating a new client (the control device 104a) that is located on the LAN 111, which is similar to the FIG. 8A example. At 965a, the control device 104a sends authentication credentials to the authentication service 706a. The authentication service 706a determines whether the authentication credentials are valid, and if so, sends a token to the control device 104a at 965b.

At 965c, the control device 104a sends a command to the playback device 102n via the LAN 111. The command indicates the token. As noted above, the command may take the form of an HTTP request with a header indicating the token.

After receiving the command, the playback device 102n attempts to resolve the role corresponding to the token. At 965d, the playback device 102n sends a request for a role corresponding to the token to the authentication service 706b. The authentication service 706b determines the token-to-role mapping for the token. As explained above, the authentication service 706b maintains or has access to token-to-role mappings for each token. Within examples, determining the token-to-role mapping for the second token may involve querying a database or other data storage structure for a role matching the object and the token. At 965d, the authentication service 706b sends a response to the playback device 102n. If the token is valid, the response will indicate a success and the resolved role mapping.

After resolving the role, the playback device 102n next attempts to resolve permissions. At 965f, the playback device 102n sends a request to resolve permissions to the authentication service 706b. The request indicates the role. The authentication service 706b resolves the permission set corresponding to the role. At 965g, the authentication service 706b sends a response indicating the permission set (as a permission mask).

Once the playback device 102n has the permissions set, the playback device 102n may determine whether to accept or reject the command. That is, the playback device 102n may determine that the command is permitted by the resolved permission set and carry out the command. For instance, the playback device 102n may read or modify a particular namespace of the platform API. Conversely, the playback device 102n may determine that the command is prohibited by the resolved permission set and not carry out the command.

In some cases, the command targets other or additional playback devices 102 in the media playback system. For instance, the command may target the playback devices 102k and 102l (and perhaps not the playback device 102, which may act as a point-of-contact for the control device 104a). In such examples, carrying out the command may involve causing the targeted playback devices 102k and 102l to carry out the command. For instance, at 965h and 965i, the playback device 102 may event changes to the particular namespace over the LAN 111 to the playback devices 102k and 102l, respectively, which cause the playback devices 102k and 102l to carry out the command.

A command result may be sent back to the control device 104a. To illustrate, at 965j, the playback device 102n sends a command result. Alternatively, one or both of the playback devices 102k and 102l may send back a command result.

FIG. 9B is an example of authenticating a new client (the control device 104b) that is not located on the LAN 111 but instead connected to the media playback system 100 via a wide area network. At 966a, the control device 104b sends authentication credentials to the authentication service 706a. The authentication service 706a determines whether the authentication credentials are valid, and if so, sends a token to the control device 104b at 966b.

At 966c, the control device 104b sends a command to the playback device 102n via an API gateway 706c. The API gateway 706c provides a point-of-contact outside of the LAN 111 for clients over the WAN. At 966d, the API gateway 706c sends the command including the token to the playback device 102n.

After receiving the command, the playback device 102n attempts to resolve the role corresponding to the token. At 966e, the playback device 102n sends a request for a role corresponding to the token to the authentication service 706b. The authentication service 706b determines the token-to-role mapping for the token. At 966f, the authentication service 706b sends a response to the playback device 102n. If the token is valid, the response will indicate a success and the resolved role mapping.

After resolving the role, the playback device 102n next attempts to resolve permissions. In this example, the role-to-permission caching is cached in the edge data cache 760. As such, the playback device 102n can resolve the permission set without communicating again with the authentication service 706b.

Once the playback device 102n has resolved the permissions set, the playback device 102n may determine whether to accept or reject the command. That is, the playback device 102n may determine that the command is permitted by the resolved permission set and carry out the command. Conversely, the playback device 102n may determine that the command is prohibited by the resolved permission set and not carry out the command.

FIG. 9C is an example of authenticating a new client (the NMD 103f) that is located on the LAN 111 but includes third-party software (e.g., to process voice inputs via the VAS 190). At 967a, the NMD 103f sends a voice input to the computing devices 106a. At 967b, the computing devices 106a sends authentication credentials to the authentication service 706a. The authentication service 706a determines whether the authentication credentials are valid, and if so, sends a token to the computing devices 106a at 967c.

At 967d, the computing devices 106a send a command to the playback device 102n via the API gateway 706c. As noted above, the API gateway 706c provides a point-of-contact outside of the LAN 111 for clients over the WAN. At 967e, the API gateway 706c sends the command including the token to the playback device 102n.

After receiving the command, the playback device 102n attempts to resolve the role corresponding to the token. At 967f, the playback device 102n sends a request for a role corresponding to the token to the authentication service 706b. The authentication service 706b determines the token-to-role mapping for the token. At 967g, the authentication service 706b sends a response to the playback device 102n. If the token is valid, the response will indicate a success and the resolved role mapping.

After resolving the role, the playback device 102n next attempts to resolve permissions. In this example, the role-to-permission caching is cached in the edge data cache 760. As such, the playback device 102n can resolve the permission set without communicating again with the authentication service 706b.

Once the playback device 102n has resolved the permissions set, the playback device 102n may determine whether to accept or reject the command. That is, the playback device 102n may determine that the command is permitted by the resolved permission set and carry out the command. Conversely, the playback device 102n may determine that the command is prohibited by the resolved permission set and not carry out the command.

IV. Example Methods

Figure 10:
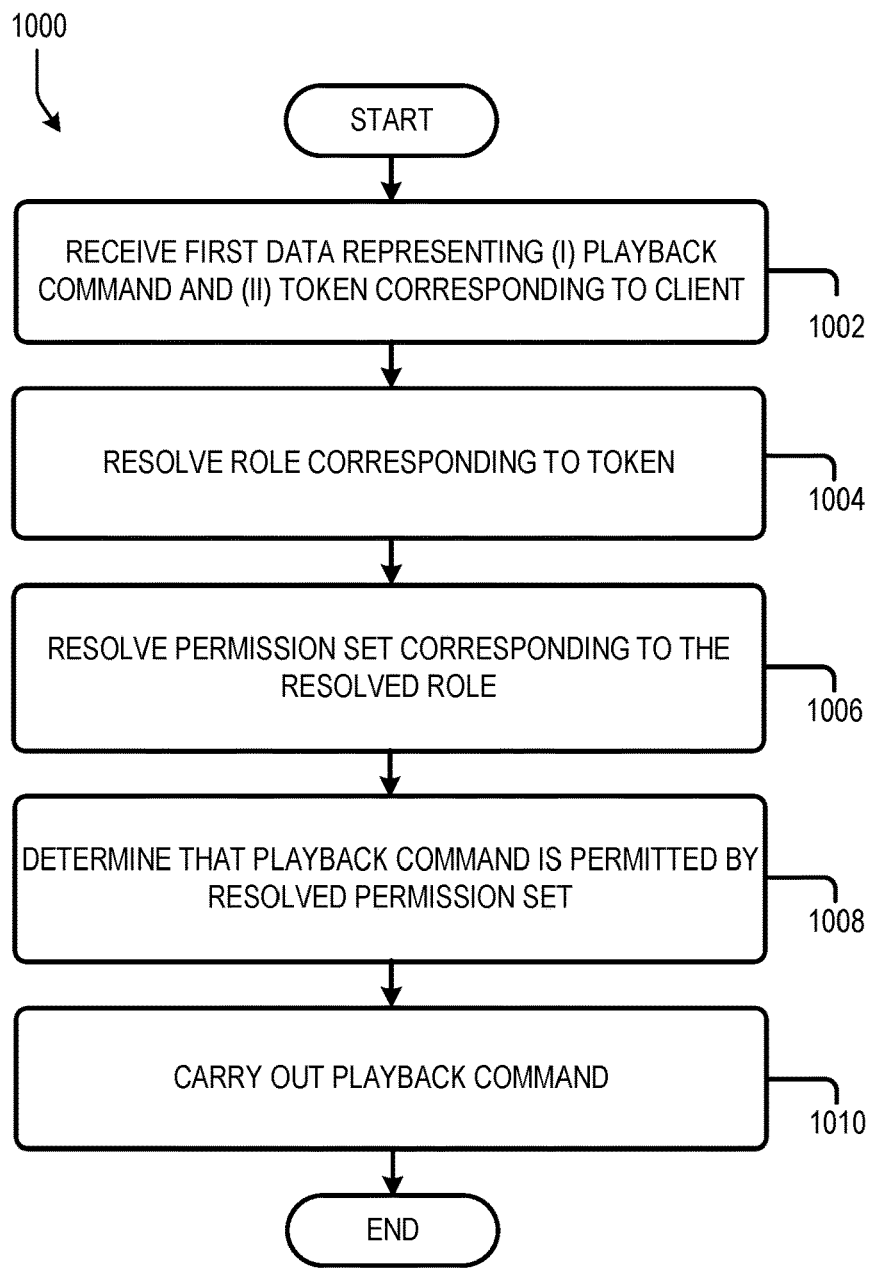
FIG. 10 is a flow diagram of an example method to process command intermediates in accordance with aspects of the disclosed technology.

FIG. 10 is a flow diagram showing an example method 1000 to authenticate a client and carry out a restricted command. The method 1000 may be performed by one or more playback device(s) 102. Alternatively, the method 1000 may be performed by any suitable device or by a system of devices, such as the playback devices 102, the NMDs 103, control devices 104, computing devices 105, computing devices 106, or by smart IOT devices (such as the smart illumination device 108 or smart thermostat 110). For the purposes of illustration, certain features are described as being performed by the playback device 102n and/or the platform servers 706 (FIG. 7).

At block 1002, the method 1000 involves (i) receiving data representing a playback command and (ii) a token corresponding to a client. For example, the playback device 102n may receive, via a first network interface, first data representing (i) a first playback command and (ii) a first token corresponding to a first client, such as the control device 104a (FIGS. 7, 8A-8B). In some cases, the first client and the playback device are connected to a local area network (FIG. 9A). In other cases, clients are not connected to the local area network (e.g., FIG. 9B).

At block 1004, the method 1000 involves resolving a role corresponding to the token. For example, the playback device 102n and the authentication service 706b may resolve a first role corresponding to the first token (FIG. 8A) based on a token-to-role mapping. Alternatively, the playback device 102n may resolve a first role corresponding to the first token using an edge data cache (FIG. 8B). Within examples, the playback device 102n may cache, in the edge data cache, the first token-to-role mapping that maps the first token to the first role (FIGS. 8A and 8C).

In an example, the playback device 102n may determine that an edge data cache (e.g., the edge data cache 760) excludes a token-to-role mapping corresponding to the first token (e.g., 865d in FIG. 8A). The playback device 102n may send, via the first network interface to the computing system, a request for a role corresponding to the first token (e.g., 865e in FIG. 8A). The platform servers 706 may receive, via a second network interface, the request for the role corresponding to the first token and determine, based on stored token-to-role mappings for a plurality of media playback systems, a first token-to-role mapping that maps the first token to a first role for the media playback system (FIG. 8A). The platform servers 706 may send, via the second network interface to the playback device, data representing the first token-to-role mapping for the media playback system and the playback device 102n may receive, via the network interface, a response to the request indicating the first token-to-role mapping that maps the first token to the first role (e.g., 865h in FIG. 8A).

In another example, the playback device 102n may determine that an edge data cache (e.g., the edge data cache 760) includes a token-to-role mapping corresponding to the first token (e.g., 866b in FIG. 8B). In such an example, the playback device 102n may resolve the first role based on the edge data cache (e.g., based on a cached token-to-role mapping in the edge data cache 760). In a further example, when cached data in the edge data cache is stale, the playback device 102n may resolve the first role based on a conditional request (FIG. 8C).

At block 1106, the method 1100 involves resolving the permission set corresponding to the resolved role. For example, the playback device 102n and the authentication service 706b may resolve a first permission set corresponding to the first role (FIG. 8A) based on a role-to-permission mapping. Alternatively, the playback device 102n may resolve the first permission set corresponding to the first role using an edge data cache (FIG. 8B). The permission set may be represented as a permission mask.

In an example, the playback device 102m may determine that the edge data cache includes a first role-to-permission mapping corresponding to the first role (e.g., 866c in FIG. 8B) The first role-to-permission mapping maps the first role to a first permission set. As such, the playback device 102 may resolve the first permission set using the cached first role-to-permission mapping.

In another example, the playback device 102n may determine that the edge data cache excludes a role-to-permission mapping corresponding to the first token (e.g., 865j in FIG. 8A). The playback device 102n may send, via the first network interface to the computing system, a request for a permission set corresponding to the first role (e.g., 865k in FIG. 8A). The platform servers 706 may receive, via a second network interface, the request for the permission set corresponding to the first token and determine, based on stored role-to-permission mappings for a plurality of media playback systems, a first role-to-permission mapping that maps the first role to a first permission set for the media playback system (FIG. 8A). The platform servers 706 may send, via the second network interface to the playback device, data representing the first role-to-permission mapping for the media playback system and the playback device 102n may receive, via the network interface, a response to the request indicating the first role-to-permission mapping (e.g., 865l in FIG. 8A).

At block 1108, the method 100 involves determining that the playback command is permitted by the resolved permission set. For instance, the playback device 102n may determine that the playback command is permitted based on a namespace of a resource being created, read, deleted, modified, or otherwise referenced and a portion of a bitmask indicating permission (or not) for that action (FIG. 8A). Other examples are possible as well.

At block 1010, the method 1000 involves carrying out the playback command. In some examples, the playback device 102*n* may carry out the playback command on itself. In other examples, such as when the playback device 102*n* is in a group or different playback devices are targeted (FIG. 9A), the playback device 102*n* may carry out the playback command on the group or on the targeted playback devices.

In further examples, the method 100 involves caching in an edge data cache (e.g., the edge data cache 760). For instance, the playback device 102*n* may cache, in the edge data cache, the token-to-role mappings that maps tokens to the corresponding roles (FIG. 8A). As another example, the playback device 102*n* may cache, in the edge data cache, permission-to-role mappings that map the permissions to the corresponding roles (FIG. 8A).

In further examples, the method 1000 involves authenticating additional clients and carrying out additional commands from such clients. Further variations and functions that may be performed as part of the method 1000 are described throughout this disclosure, including in the foregoing sections I, II, and III.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

EXAMPLE 1

A method to be performed in a system comprising a first playback device, the method comprising: receiving, via a first network interface, first data representing (i) a first playback command and (ii) a first token corresponding to a first client; determining that an edge data cache excludes a token-to-role mapping corresponding to the first token; sending, via the first network interface to a computing system, a request for a role corresponding to the first token; receiving, via the first network interface, a response to the request indicating a first token-to-role mapping that maps the first token to a first role; when the edge data cache excludes the token-to-role mapping corresponding to the first token, caching, in the edge data cache, the first token-to-role mapping that maps the first token to the first role; determining that the edge data cache includes a first role-to-permission mapping corresponding to the first role, wherein the first role-to-permission mapping maps the first role to a first permission set; determining that the first playback command is permitted by the first permission set; and based on determining that the first playback command is permitted by the first permission set, carrying out the first playback command.

EXAMPLE 2

The method of Example 1, wherein the system further comprises the computing system, and wherein the method further comprises: receiving, via the second network interface, the request for the role corresponding to the first token; determining, based on stored token-to-role mappings for a plurality of media playback systems, the first token-to-role mapping that maps the first token to the first role for the media playback system; and sending, via the second network interface to the playback device, data representing the first token-to-role mapping for the media playback system.

EXAMPLE 3

The method of any of Examples 1-2, further comprising: after caching the first token-to-role mapping in the edge data cache, receiving, via the first network interface, second data representing (i) a second playback command and (ii) a second token corresponding to the first client; determining that the edge data cache includes the token-to-role mapping corresponding to the first token; determining that the edge data cache includes the first role-to-permission mapping corresponding to the first role; determining that the second playback command is permitted by the first permission set; and based on determining that the second playback command is permitted by the first permission set, carrying out the second playback command.

EXAMPLE 4

The method of any of Examples 1-3, further comprising: receiving, via the first network interface, third data representing (i) a third playback command and (ii) a second token corresponding to a second client; determining that the edge data cache excludes a token-to-role mapping corresponding to the second token; sending, via the first network interface to the computing system, a request for a role corresponding to the second token; receiving, via the first network interface, a response to the request indicating a second token-to-role mapping that maps the second token to a second role; when the edge data cache excludes the token-to-role mapping corresponding to the second token, caching, in the edge data cache, a second token-to-role mapping that maps the second token to the second role; determining that the edge data cache excludes a second role-to-permission mapping corresponding to the second role; sending, via the first network interface to the computing system, a request for a permission set corresponding to the second role; receiving, via the first network interface, a response to the request indicating a second role-to-permission mapping that maps the second role to a second permission set; when the edge data cache excludes the token-to-role mapping corresponding to the second token, caching, in the edge data cache, the second role-to-permission mapping that maps the second role to the second permission set; determining that the third playback command is permitted by the second permission set; and based on determining that the third playback command is permitted by the second permission set, carrying out the third playback command.

EXAMPLE 5

The method of Example 4, further comprising: receiving, via the first network interface, fourth data representing (i) a fourth playback command and (ii) the second token corresponding to the second client; determining that the edge data cache includes the token-to-role mapping corresponding to the second token; determining that the edge data cache includes a second role-to-permission mapping corresponding to the second role and that the second role-to-permission mapping is stale as a time-to-live period has expired; sending, via the first network interface to the computing system, a conditional request for a permission set corresponding to the second role, the conditional request indicating a version of the second role-to-permission mapping in the edge data cache; receiving, via the first network interface, a response to the request indicating that the version of the second role-to-permission mapping in the edge data cache matches a version of the second role-to-permission mapping at the computing system; when the response to the request indicating that the version of the second role-to-permission mapping in the edge data cache matches a version of the second role-to-permission mapping at the computing system, re-caching, in the edge data cache, the second role-to-permission mapping that maps the second role to the second permission set for another iteration of the time-to-live period; determining that the fourth playback command is permitted by the second permission set; and based on determining that the fourth playback command is permitted by the second permission set, carrying out the fourth playback command.

EXAMPLE 6

The method of any of Examples 1-5, wherein the system further comprises the computing system, and wherein the method further comprises: receiving, via the second network interface, the request for the permission set corresponding to the second role; determining, based on stored role-to-permission mappings, the second role-to-permission mapping that maps the second role to the second permission set; and sending, via the second network interface to the playback device, data representing the second role-to-permission mapping.

EXAMPLE 7

The method of any of Examples 1-6, further comprising: before determining that the edge data cache includes the first role-to-permission mapping corresponding to the first role, sending, via the first network interface, a request for the first permission set corresponding to the first role; and caching, in the edge data cache, the first role-to-permission mapping that maps the first role to the first permission set.

EXAMPLE 8

The method of any of Examples 1-7, wherein the first client comprises an application executing on a mobile device, and wherein the functions further comprise: sending, via the first network interface to the mobile device, data representing a result of the first playback command, wherein the data representing the result of the first playback command causes the application to update a graphical user interface displayed on the mobile device to indicate the result of the first playback command.

EXAMPLE 9

The method of any of Examples 1-8, wherein the first playback command is a volume adjustment command, and wherein the first permission set comprises a first permission mask comprising digits settable to values corresponding to a read permission or a modify permission, the digits comprising a volume permission digit, and wherein determining that the first playback command is permitted by the first permission set comprises determining that the volume permission digit indicates a value corresponding to the modify permission.

EXAMPLE 10

The method of any of Examples 1-9, wherein receiving the first data representing the first playback command comprises receiving data representing a first universal plug- and play (UPnP) command, and wherein determining that the first playback command is permitted by the first permission set comprises: mapping the first UPnP command to a corresponding first media playback system command; and determining that the first media playback system command is permitted by the first permission set.

EXAMPLE 11

The method of any of Examples 1-10, further comprising: receiving, via the first network interface, fifth data representing (i) a fifth playback command, wherein the fifth data excludes a token; determining that the edge data cache excludes a token-to-role mapping corresponding to a token absence; sending, via the first network interface to the computing system, a request for a role corresponding to the token absence; receiving, via the first network interface, a response to the request indicating a token-to-role mapping that maps the token absence to the first role; determining that the edge data cache includes the first role-to-permission mapping corresponding to the first role; determining that the fourth playback command is prohibited by the first permission set; and based on determining that the fourth playback command is prohibited by the first permission set, foregoing carrying out the fourth playback command.

EXAMPLE 12

The method of any of Examples 1-11, wherein carrying out the first playback command comprises causing at least one additional playback device of the media playback system to carry out the first playback command.

EXAMPLE 13

The method of any of Examples 1-12, wherein the system further comprises the computing system, and wherein the method further comprises: validating the first token, and wherein determining the first token-to-role mapping that maps the first token to the first role for the media playback system comprises determining a particular first token-to-role mapping that maps the validated first token to the first role for the media playback system, wherein an invalid token maps to another role that is different from the first role.

EXAMPLE 14

The method of any of Examples 1-13, further comprising: before determining that the edge data cache includes the first role-to-permission mapping corresponding to the first role, sending, via the first network interface to the computing system, an if-modified-since request for a role-to-permission mapping corresponding to the first role, the if-modified-since request indicating a particular time and date;

EXAMPLE 15

The method of any preceding Example, receiving, via the first network interface, a response to the if-modified-since request indicating that the role-to-permission mapping corresponding to the first role is modified since the particular time and date, wherein the response indicates the first role-to-permission mapping that maps the first role to the first permission set; and caching, in the edge data cache, the first role-to-permission mapping that maps the first role to the first permission set.

EXAMPLE 16

A tangible, non-transitory, computer-readable medium having instructions stored thereon that are executable by one or more processors to cause a system to perform the method of any one of Examples 1-15.

EXAMPLE 17

A device comprising a network interface, one or more processors, and a tangible, non-tangible computer-readable medium having instructions stored thereon that are executable by the one or more processors to cause the system to perform the method of any of Examples 1-15.

EXAMPLE 18

A system comprising a network interface, one or more processors, and a tangible, non-tangible computer-readable medium having instructions stored thereon that are executable by the one or more processors to cause the system to perform the method of any of Examples 1-15.

What is claimed is:

1. A system comprising a playback device of a media playback system and a computing system, the playback device comprising:
   a first network interface;
   at least one first processor; and
   at least one first tangible, non-transitory computer-readable medium comprising first program instructions that are executable by the at least one first processor such that the playback device is configured to:
      receive, via the first network interface, first data representing (i) a first playback command and (ii) a first token corresponding to a first client, wherein the first client and the playback device are connected to a local area network;
      determine that an edge data cache on the playback device excludes a token-to-role mapping corresponding to the first token;
      send, via the first network interface to the computing system, a request for a role corresponding to the first token, wherein the computing system is outside of the local area network;
      receive, via the first network interface, a response to the request, the response indicating a first token-to-role mapping that maps the first token to a first role;
      cache, in the edge data cache, the first token-to-role mapping that maps the first token to the first role;
      determine that the edge data cache includes a first role-to-permission mapping corresponding to the first role, wherein the first role-to-permission mapping maps the first role to a first permission set;
      determine that the first playback command is permitted by the first permission set; and
      based on the determination that the first playback command is permitted by the first permission set, carryout the first playback command; and
   the computing system comprising:
   a second network interface;
   at least one second processor; and
   at least one second tangible, non-transitory computer-readable medium comprising second program instructions that are executable by the at least one second processor such that the computing system is configured to:
   receive, via the second network interface, the request for the role corresponding to the first token;
   determine, based on stored token-to-role mappings for a plurality of media playback systems, the first token-to-role mapping that maps the first token to the first role for the media playback system; and
   send, via the second network interface to the playback device, data representing the first token-to-role mapping for the media playback system.

2. The system of claim 1, wherein the at least one first non-transitory computer-readable medium further comprises first program instructions that are executable by the at least one first processor such that the playback device is further configured to:
   after caching the first token-to-role mapping in the edge data cache, receive, via the first network interface, second data representing (i) a second playback command and (ii) the first token corresponding to the first client;
   determine that the edge data cache includes the token-to-role mapping corresponding to the first token;

determine that the edge data cache includes the first role-to-permission mapping corresponding to the first role;

determine that the second playback command is permitted by the first permission set; and based on the determination that the second playback command is permitted by the first permission set, carry out the second playback comma nd.

3. The system of claim 1, wherein the at least one first non-transitory computer-readable medium further comprises first program instructions that are executable by the at least one first processor such that the playback device is further configured to:

receive, via the first network interface, third data representing (i) a third playback command and (ii) a second token corresponding to a second client;

determine that the edge data cache excludes a token-to-role mapping corresponding to the second token;

send, via the first network interface to the computing system, a request for a role corresponding to the second token;

receive, via the first network interface, a response to the request, the response indicating a second token-to-role mapping that maps the second token to a second role;

cache, in the edge data cache, a second token-to-role mapping that maps the second token to the second role;

determine that the edge data cache excludes a second role-to-permission mapping corresponding to the second role;

send, via the first network interface to the computing system, a request for a permission set corresponding to the second role;

receive, via the first network interface, a response to the request indicating a second role-to-permission mapping that maps the second role to a second permission set;

cache, in the edge data cache, the second role-to-permission mapping that maps the second role to the second permission set;

determine that the third playback command is permitted by the second permission set; and based on the determination that the third playback command is permitted by the second permission set, carryout the third playback command.

4. The system of claim 3, wherein the at least one first non-transitory computer-readable medium further comprises first program instructions that are executable by the at least one first processor such that the playback device is further configured to:

receive, via the first network interface, fourth data representing (i) a fourth playback command and (ii) the second token corresponding to the second client;

determine that the edge data cache includes the token-to-role mapping corresponding to the second token;

determine that the edge data cache includes a second role-to-permission mapping corresponding to the second role and that the second role-to-permission mapping is stale as a time-to-live period has expired;

send, via the first network interface to the computing system, a conditional request for a permission set corresponding to the second role, the conditional request indicating a version of the second role-to-permission mapping in the edge data cache;

receive, via the first network interface, a response to the request indicating that the version of the second role-to-permission mapping in the edge data cache matches a version of the second role-to-permission mapping at the computing system;

when the response to the request indicating that the version of the second role-to-permission mapping in the edge data cache matches a version of the second role-to-permission mapping at the computing system, re-cache, in the edge data cache, the second role-to-permission mapping that maps the second role to the second permission set for another iteration of the time-to-live period;

determine that the fourth playback command is permitted by the second permission set; and based on the determination that the fourth playback command is permitted by the second permission set, carry out the fourth playback command.

5. The system of claim 3, wherein the at least one second non-transitory computer-readable medium further comprises second program instructions that are executable by the at least one second processor such that the computing system is further configured to:

receive, via the second network interface, the request for the permission set corresponding to the second role;

determine, based on stored role-to-permission mappings, the second role-to-permission mapping that maps the second role to the second permission set; and send, via the second network interface to the playback device, data representing the second role-to-permission mapping.

6. The system of claim 1, wherein the at least one first non-transitory computer-readable medium further comprises first program instructions that are executable by the at least one first processor such that the playback device is further configured to:

before the determination that the edge data cache includes the first role-to-permission mapping corresponding to the first role, send, via the first network interface, a request for the first permission set corresponding to the first role; and cache, in the edge data cache, the first role-to-permission mapping that maps the first role to the first permission set.

7. The system of claim 1, wherein the first client comprises an application executing on a mobile device, and wherein the at least one first non-transitory computer-readable medium further comprises first program instructions that are executable by the at least one first processor such that the playback device is further configured to:

send, via the first network interface to the mobile device, data representing a result of the first playback command, wherein the data representing the result of the first playback command causes the application to update a graphical user interface displayed on the mobile device to indicate the result of the first playback command.

8. The system of claim 1, wherein the first playback command is a volume adjustment command, and wherein the first permission set comprises a first permission mask comprising digits settable to values corresponding to a read permission or a modify permission, the digits comprising a volume permission digit, and wherein the first program instructions that are executable by the at least one first processor such that the playback device is configured to determine that the first playback command is permitted by the first permission set comprise first program instructions that are executable by the at least one first processor such that the playback device is configured to:

determine that the volume permission digit indicates a value corresponding to the modify permission.

9. The system of claim 1, wherein the first program instructions that are executable by the at least one first processor such that the playback device is configured to receive the first data representing the first playback command comprise first program instructions that are executable by the at least one first processor such that the playback device is configured to receive data representing a first universal plug-and play (UPnP) command, and wherein the first program instructions that are executable by the at least one first processor such that the playback device is configured to determine that the first playback command is permitted by the first permission set comprise first program instructions that are executable by the at least one first processor such that the playback device is configured to:
 map the first UPnP command to a corresponding first media playback system command; and
 determine that the first media playback system command is permitted by the first permission set.

10. The system of claim 1, wherein the at least one first non-transitory computer-readable medium further comprises first program instructions that are executable by the at least one first processor such that the playback device is further configured to:
 receive, via the first network interface, fifth data representing (i) a fifth playback command, wherein the fifth data excludes a token;
 determine that the edge data cache excludes a token-to-role mapping corresponding to a token absence;
 send, via the first network interface to the computing system, a request for a role corresponding to the token absence;
 receive, via the first network interface, a response to the request indicating a token-to-role mapping that maps the token absence to the first role;
 determine that the edge data cache includes the first role-to-permission mapping corresponding to the first role;
 determine that the fifth playback command is prohibited by the first permission set; and
 based on the determination that the fifth playback command is prohibited by the first permission set, forego carrying out the fifth playback command.

11. The system of claim 1, wherein the first program instructions that are executable by the at least one first processor such that the playback device is configured to carry out the first playback command comprise first program instructions that are executable by the at least one first processor such that the playback device is configured to:
 cause at least one additional playback device of the media playback system to carry out the first playback command.

12. The system of claim 1, wherein the at least one second non-transitory computer-readable medium further comprises second program instructions that are executable by the at least one second processor such that the computing system is further configured to:
 validate the first token, and wherein the second program instructions that are executable by the at least one second processor such that the computing system is configured to determine the first token-to-role mapping that maps the first token to the first role for the media playback system comprise second program instructions that are executable by the at least one second processor such that the computing system is configured to:
 determine a particular first token-to-role mapping that maps the validated first token to the first role for the media playback system, wherein an invalid token maps to another role that is different from the first role.

13. The system of claim 1, wherein the at least one first non-transitory computer-readable medium further comprises first program instructions that are executable by the at least one first processor such that the playback device is further configured to:
 before the determination that the edge data cache includes the first role-to-permission mapping corresponding to the first role, send, via the first network interface to the computing system, an if-modified-since request for a role-to-permission mapping corresponding to the first role, the if-modified-since request indicating a particular time and date;
 receive, via the first network interface, a response to the if-modified-since request indicating that the role-to-permission mapping corresponding to the first role is modified since the particular time and date, wherein the response indicates the first role-to-permission mapping that maps the first role to the first permission set; and
 cache, in the edge data cache, the first role-to-permission mapping that maps the first role to the first permission set.

14. A playback device of a media playback system, the playback device comprising:
 a network interface;
 at least one processor; and
 at least one tangible, non-transitory computer-readable medium comprising program instructions that are executable by the at least one processor such that the playback device is configured to:
 receive, via the network interface, first data representing (i) a first playback command and (ii) a first token corresponding to a first client, wherein the first client and the playback device are connected to a local area network;
 determine that a n edge data cache on the playback device excludes a token-to-role mapping corresponding to the first token;
 send, via the network interface to a computing system, a request for a role corresponding to the first token, wherein the computing system is outside of the local area network;
 receive, via the network interface, a response to the request, the response indicating a first token-to-role mapping that maps the first token to a first role;
 cache, in the edge data cache, the first token-to-role mapping that maps the first token to the first role;
 determine that the edge data cache includes a first role-to-permission mapping corresponding to the first role, wherein the first role-to-permission mapping maps the first role to a first permission set;
 determine that the first playback command is permitted by the first permission set; and
 based on the determination that the first playback command is permitted by the first permission set, carryout the first playback command.

15. The playback device of claim 14, wherein the at least one non-transitory computer-readable medium further comprises program instructions that are executable by the at least one processor such that the playback device is configured to:
 after caching the first token-to-role mapping in the edge data cache, receive, via the network interface, second data representing (i) a second playback command and (ii) the first token corresponding to the first client;

determine that the edge data cache includes the token-to-role mapping corresponding to the first token;

determine that the edge data cache includes the first role-to-permission mapping corresponding to the first role;

determine that the second playback command is permitted by the first permission set; and based on the determination that the second playback command is permitted by the first permission set, carryout the second playback command.

16. The playback device of claim 14, wherein the at least one non-transitory computer-readable medium further comprises program instructions that are executable by the at least one processor such that the playback device is configured to:

receive, via the network interface, third data representing (i) a third playback command and (ii) a second token corresponding to a second client;

determine that the edge data cache excludes a token-to-role mapping corresponding to the second token;

send, via the network interface to the computing system, a request for a role corresponding to the second token;

receive, via the network interface, a response to the request, the response indicating a second token-to-role mapping that maps the second token to a second role;

cache, in the edge data cache, a second token-to-role mapping that maps the second token to the second role;

determine that the edge data cache excludes a second role-to-permission mapping corresponding to the second role;

send, via the network interface to the computing system, a request for a permission set corresponding to the second role;

receive, via the network interface, a response to the request, the response indicating a second role-to-permission mapping that maps the second role to a second permission set;

cache, in the edge data cache, the second role-to-permission mapping that maps the second role to the second permission set;

determine that the third playback command is permitted by the second permission set; and based on the determination that the third playback command is permitted by the second permission set, carryout the third playback command.

17. The playback device of claim 16, wherein the at least one non-transitory computer-readable medium further comprises program instructions that are executable by the at least one processor such that the playback device is configured to:

receive, via the network interface, fourth data representing (i) a fourth playback command and (ii) the second token corresponding to the second client;

determine that the edge data cache includes the token-to-role mapping corresponding to the second token;

determine that the edge data cache includes a second role-to-permission mapping corresponding to the second role and that the second role-to-permission mapping is stale as a time-to-live period has expired;

send, via the network interface to the computing system, a conditional request for a permission set corresponding to the second role, the conditional request indicating a version of the second role-to-permission mapping in the edge data cache;

receive, via the network interface, a response to the request, the response indicating that the version of the second role-to-permission mapping in the edge data cache matches a version of the second role-to-permission mapping at the computing system;

when the response to the request indicating that the version of the second role-to-permission mapping in the edge data cache matches a version of the second role-to-permission mapping at the computing system, re-cache, in the edge data cache, the second role-to-permission mapping that maps the second role to the second permission set for another iteration of the time-to-live period;

determine that the fourth playback command is permitted by the second permission set; and based on the determination that the fourth playback command is permitted by the second permission set, carryout the fourth playback command.

18. The playback device of claim 14, wherein the at least one non-transitory computer-readable medium further comprises program instructions that are executable by the at least one processor such that the playback device is configured to:

before the determination that the edge data cache includes the first role-to-permission mapping corresponding to the first role, send, via the network interface, a request for the first permission set corresponding to the first role; and cache, in the edge data cache, the first role-to-permission mapping that maps the first role to the first permission set.

19. The playback device of claim 14, wherein the first client comprises an application executing on a mobile device, and wherein the at least one non-transitory computer-readable medium further comprises program instructions that are executable by the at least one processor such that the playback device is configured to:

send, via the network interface to the mobile device, data representing a result of the first playback command, wherein the data representing the result of the first playback command causes the application to update a graphical user interface displayed on the mobile device to indicate the result of the first playback command.

20. A tangible non-transitory computer-readable medium comprising program instructions that are executable by at least one processor such that a playback device is configured to:

receive, via a network interface, first data representing (i) a playback command and (ii) a token corresponding to a client;

determine that an edge data cache on the playback device excludes a token-to-role mapping corresponding to the token;

send, via the network interface to a computing system, a request for a role corresponding to the token;

receive, via the network interface, a response to the request, the response indicating a particular token-to-role mapping that maps the token to a role;

cache, in the edge data cache, the particular token-to-role mapping that maps the token to the role;

determine that the edge data cache includes a role-to-permission mapping corresponding to the role, wherein role-to-permission mapping maps the role to a permission set;

determine that the playback command is permitted by the permission set; and based on the determination that the playback command is permitted by the permission set, carryout the playback command.

* * * * *

UNITED STATES PATENT AND TRADEMARK OFFICE
CERTIFICATE OF CORRECTION

PATENT NO. : 12,166,762 B2  
APPLICATION NO. : 17/662530  
DATED : December 10, 2024  
INVENTOR(S) : Ramsperger et al.

Page 1 of 1

It is certified that error appears in the above-identified patent and that said Letters Patent is hereby corrected as shown below:

In the Claims

In Column 42, in Claim 1, Line 38, delete "carryout" and insert -- carry out --, therefor.

In Column 43, in Claim 2, Line 8, delete "comma nd." and insert -- command. --, therefor.

In Column 43, in Claim 3, Lines 42-43, delete "carryout" and insert -- carry out --, therefor.

In Column 46, in Claim 14, Line 39, after "that" delete "a n" and insert -- an --, therefor.

In Column 46, in Claim 14, Line 58, delete "carryout" and insert -- carry out --, therefor.

In Column 47, in Claim 15, Line 11, delete "carryout" and insert -- carry out --, therefor.

In Column 47, in Claim 16, Lines 44-45, delete "carryout" and insert -- carry out --, therefor.

In Column 48, in Claim 17, Line 14, delete "carryout" and insert -- carry out --, therefor.

In Column 48, in Claim 20, Line 63, delete "carryout" and insert -- carry out --, therefor.

Signed and Sealed this  
Twenty-first Day of January, 2025

Coke Morgan Stewart  
*Acting Director of the United States Patent and Trademark Office*